US009519726B2

(12) United States Patent
Kumar et al.

(10) Patent No.: US 9,519,726 B2
(45) Date of Patent: Dec. 13, 2016

(54) SURFACING APPLICATIONS BASED ON BROWSING ACTIVITY

(76) Inventors: Amit Kumar, Redmond, WA (US); Milind Mahajan, Redmond, WA (US)

( * ) Notice: Subject to any disclaimer, the term of this patent is extended or adjusted under 35 U.S.C. 154(b) by 368 days.

(21) Appl. No.: 13/161,792

(22) Filed: Jun. 16, 2011

(65) Prior Publication Data
US 2012/0323898 A1 Dec. 20, 2012

(51) Int. Cl.
G06F 7/00 (2006.01)
G06F 17/30 (2006.01)
G06Q 30/02 (2012.01)

(52) U.S. Cl.
CPC ... G06F 17/30899 (2013.01); G06F 17/30867 (2013.01); G06F 17/30876 (2013.01); G06Q 30/0251 (2013.01); G06Q 30/0277 (2013.01)

(58) Field of Classification Search
CPC .................. G06F 17/30864; G06F 17/30876; G06F 17/30882; G06Q 30/0251; G06Q 30/0277; G06Q 30/0256
USPC ................... 707/708, 723; 705/14.54, 14.73
See application file for complete search history.

(56) References Cited

U.S. PATENT DOCUMENTS

| 6,366,906 | B1* | 4/2002 | Hoffman |
| 6,804,659 | B1* | 10/2004 | Graham et al. ............. 705/14.49 |
| 7,260,568 | B2 | 8/2007 | Zhang et al. |
| 7,466,859 | B2* | 12/2008 | Chang et al. ................. 382/181 |
| 7,890,526 | B1* | 2/2011 | Brewer et al. ................ 707/767 |
| 8,392,282 | B2 | 3/2013 | Nagasaka et al. |
| 8,484,636 | B2 | 7/2013 | Mehta et al. |
| 8,515,979 | B2* | 8/2013 | Mehta ........................... 707/758 |
| 8,615,510 | B2* | 12/2013 | Chi et al. ...................... 707/722 |
| 2001/0042099 | A1 | 11/2001 | Peng |
| 2001/0047363 | A1 | 11/2001 | Peng |
| 2002/0143991 | A1* | 10/2002 | Chow et al. .................. 709/245 |
| 2003/0105682 | A1* | 6/2003 | Dicker et al. ................... 705/27 |
| 2003/0149688 | A1 | 8/2003 | Maeno |
| 2004/0181525 | A1 | 9/2004 | Itzhak et al. |
| 2005/0004889 | A1* | 1/2005 | Bailey et al. ..................... 707/1 |
| 2005/0267872 | A1* | 12/2005 | Galai et al. ....................... 707/3 |
| 2006/0155728 | A1 | 7/2006 | Bosarge |

(Continued)

FOREIGN PATENT DOCUMENTS

| CN | 1754165 A | 3/2006 |
| CN | 101136938 A | 3/2008 |

(Continued)

OTHER PUBLICATIONS

"AppHome—Application Launcher for Chrome", Retrieved on: Apr. 4, 2011, Available at: https://chrome.google.com/extensions/detail/klccobpblobingcdadneebgfcjnkbapm?hl=en.

(Continued)

Primary Examiner — Marc Somers
(74) Attorney, Agent, or Firm — Dave Ream; Tom Wong; Micky Minhas

(57) ABSTRACT

Applications are surfaced to a user during browsing without requiring a specific search by the user. The applications can be selected for surfacing to the user based on the network address entered into the address bar of a browser, the content of the page corresponding to the network address, or a combination thereof. Applications may be selected for surfacing based on a partial address entered into the address bar and/or based on the web page content that is currently visible in the browser display.

20 Claims, 12 Drawing Sheets

(56) References Cited

U.S. PATENT DOCUMENTS

| | | | |
|---|---|---|---|
| 2007/0288514 A1* | 12/2007 | Reitter et al. | 707/104.1 |
| 2007/0288648 A1 | 12/2007 | Mehanna et al. | |
| 2008/0147856 A1 | 6/2008 | Lee et al. | |
| 2008/0235187 A1 | 9/2008 | Gade et al. | |
| 2008/0270228 A1* | 10/2008 | Dasdan | 705/14 |
| 2008/0281816 A1* | 11/2008 | Kim | 707/6 |
| 2009/0006330 A1 | 1/2009 | Pandey et al. | |
| 2009/0132529 A1* | 5/2009 | Gibbs | 707/5 |
| 2009/0300656 A1 | 12/2009 | Bosworth et al. | |
| 2010/0106703 A1* | 4/2010 | Cramer | 707/706 |
| 2010/0191856 A1* | 7/2010 | Gupta et al. | 709/228 |
| 2011/0072001 A1 | 3/2011 | Basu et al. | |
| 2012/0096435 A1 | 4/2012 | Manolescu et al. | |
| 2012/0210213 A1 | 8/2012 | Watanabe et al. | |
| 2012/0290583 A1 | 11/2012 | Mahaniok et al. | |
| 2013/0132896 A1 | 5/2013 | Lee et al. | |
| 2013/0198029 A1 | 8/2013 | Mowatt et al. | |
| 2013/0290322 A1 | 10/2013 | Prosnitz et al. | |
| 2013/0290344 A1 | 10/2013 | Glover et al. | |

FOREIGN PATENT DOCUMENTS

| | | | |
|---|---|---|---|
| CN | 102360364 A | | 2/2012 |
| EP | 1540514 B1 | | 12/2010 |
| JP | 11194865 A | | 7/1999 |
| JP | 2010129073 A | | 6/2010 |
| JP | 2011076566 A | | 4/2011 |
| WO | WO2011036755 | * | 3/2011 |

OTHER PUBLICATIONS

"Chrome App Launcher Shortcut button to launch Chrome apps", Retrieved on: Apr. 4, 2011, Available at : http://www.madrasgeek.com/2011/02/chrome-app-launcher-shortcut-button-to-launch-chrome-apps.html.

"3Firefox Addons That Let You Search Faster Than Google Instant", Retrieved on: Apr. 4, 2011, Available at: http://www.makeuseof.com/tag/3-firefox-addons-search-faster-google-instant/.

Martin Brinkmann, "Mozilla Demos Web Apps Store", Retrieved on: Apr. 4, 2011, Available at: http://www.ghacks.net/2011/03/04/mozilla-demos-web-apps-store/.

"AppJump App Launcher and Organizer", Retrieved on: Apr. 5, 2011, Available at: https://chrome.google.com/extensions/detail/hc-cbinpobnjcpckmcfngmdpnbnjpmcbd.

"Omni Launch: Launch Installed Web apps from the URL bar", Retrieved on: Apr. 5, 2011, Available at: http://paul.kinlan.me/omni-launch-launch-installed-web-apps-from-th.

PCT Search Report, US2012042789, Mar. 4, 2013, Microsoft Corporation.

PCT Search Report, US 2012042786, Mar. 18, 2013, Microsoft Corporation.

International Search Report with Written Opinion dated Mar. 4, 2013 in Application No. PCT/US2012/042789, 11 pages.

International Search Report with Written Opinion dated Mar. 18, 2013 in Application No. PCT/US2012/042786, 12 pages.

"AppHome—Application Launcher for Chrome" retrieved Apr. 4, 2011, https://chrome.google.com/extensions/ detail/klc-cobpblobingcdadneebgfcjnkbapm? hl=en, 2 pages.

"Chrome App Launcher Shortcut button to launch Chrome Apps" retrieved Apr. 4, 2011, http://www.madrasgeek.com/2011/02/chrome-app-launcher-shortcut-button-to-launch-chrome-apps.html; 4 pages.

"3 Firefox Addons That Let You Search Faster Than Google Instant" retrieved Apr. 4, 2011, http://www.makeuseof.com/tag/3-firefox-addons-search-faster-google-instant/; 5 pages.

Martin Brinkmann, "Mozilla Demos Web Apps Store" retrieved Apr. 4, 2011, http://www.ghacks.net/2011/03/04/mozilla-demos-web-apps-store/; 4 pages.

AppJump App Launcher and Organizer retrieved Apr. 5, 2011, https://chrome.google.com/extensions/detail/hc-cbinpobnjcpckmcfngmdpnbnjpmcbd; 2 pages.

"Omni Launch: Launch Installed Web apps from the URL bar" retrieved Apr. 5, 2011, http://paul.kinlan.me/omni-launch-launch-installed-web-apps-from-th; 3 pages.

Sahebi, et al., "An Enhanced Similarity Measure for Utilizing Site Structure in Web Personalization Systems" in IEEE/WIC/ACM 2008 International Conference on Web Intelligence and Intelligent Agent Technology, vol. 3, Dec. 9, 2008, IEEE Computer Society, pp. 82-85.

Search Report Issued in European Patent Application No. 12800304.3, Mailed Date: Jan. 27, 2015, 9 Pages.

Search Report Issued in European Patent Application No. 12800304.3, Mailed Date: Jan. 28, 2015, 10 Pages.

First Office Action Issued in Chinese Patent Application No. 201280029479.0, Mailed Date: Jul. 15, 2015, 9 Pages.

Search Report dated Jul. 1, 2015 in Chinese Patent Application No. 201280029479.0. 4 pages.

Non-Final Office Action dated Sep. 3, 2015 in U.S. Appl. No. 14/109,782, 10 pages.

Search Report Issued in European Patent Application No. 12801233.3, Mailed Date: Jan. 28, 2015, 10 Pages.

Final Office Action dated Jan. 13, 2016 in U.S. Appl. No. 14/109,782, 16 pages.

Office Action dated May 27, 2016 in U.S. Appl. No. 14/109,782, 13 pages.

* cited by examiner

SURFACING APPLICATIONS BASED ON BROWSING ACTIVITY

BACKGROUND

Recent trends have shown that there are more and more applications, or apps, created to fulfill users' tasks. Many of these apps are available at online locations, such as retail websites, in order to offer users an effortless app-shopping experience that may be customized for devices and/or scenarios. For example, various platforms (e.g., Apple®, Android®, and Microsoft®) have had exponential growth in their respective app stores and currently offer over 500,000 aggregate apps for their respective mobile devices. One such exemplary web-centric application is the Yelp® app—the counterpart application to the www.yelp.com website—that is customized to be installed on a variety of mobile devices.

In spite of the growing use of applications, popular or relevant applications can be hard to discover. For example, the standard search protocol of conventional search engines typically surfaces websites, cards, and/or answers in response to a search query. This is true for both desktop and mobile devices. A search query specifically directed to seeking an app may return applications as part of results (e.g., "download Yelp® app"), but requiring an explicit search to surface an app may reduce the number of users who will become aware of applications that may be of interest.

SUMMARY

In various embodiments, systems and methods are provided for surfacing applications to a user during browsing, without requiring a specific search by the user. The applications can be selected for surfacing to the user based on the network address entered into the address bar of a browser, the content of the page corresponding to the network address, or a combination thereof. Depending on the embodiment, applications may be selected for surfacing based on a partial address entered into the address bar. Depending on the embodiment, applications may be selected for surfacing based on the web page content that is currently visible in the browser display. The systems and methods can include systems and methods embodied as computer readable media.

This Summary is provided to introduce a selection of concepts in a simplified form that are further described below in the Detailed Description. This Summary is not intended to identify key features or essential features of the claimed subject matter, nor is it intended to be used in isolation as an aid in determining the scope of the claimed subject matter.

BRIEF DESCRIPTION OF THE DRAWINGS

Embodiments of the invention are described in detail below with reference to the attached drawing figures, wherein.

DETAILED DESCRIPTION

Overview

Figure 1:
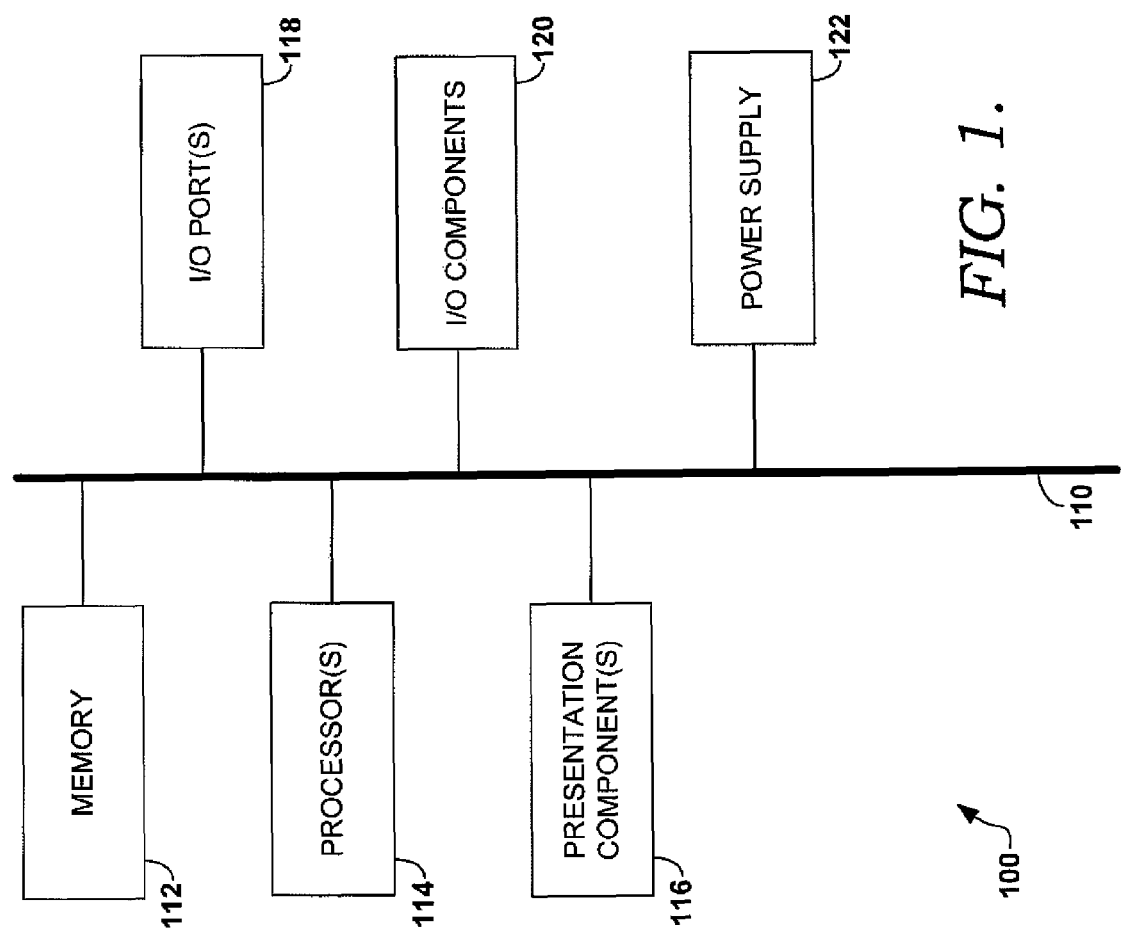
FIG. 1 is a block diagram of an exemplary computing device suitable for implementing embodiments of the invention.

In various embodiments, systems and methods are provided for surfacing apps (also referred to as applications) based on browsing activity by a user. The applications can be surfaced without the user providing a search query. Instead, the applications can be surfaced to the user based on a web page or document that is currently being viewed by a user. Additionally or alternately, applications can be surfaced based on a uniform resource locator (URL), a uniform resource indicator (URI), or another type of network address that a user is entering or has entered into the address bar of a browser. In some embodiments, the applications can be surfaced in a manner that provides additional context to a user, such as information about how an app was selected for presentation to the user.

Although applications (or apps) are growing in popularity, many general users of web browsers may be unaware of the type and number of applications that are available. Additionally, even if a user has purchased an application, the user may have forgotten about the purchase and/or the user may be unaware of the value of the application for solving a particular problem. In order to increase the utility and/or availability of applications to a user, a user's browsing activity can be used to identify applications for presentation. This presentation or surfacing of applications can be done without waiting for a search query from the user. Instead, the user's browsing activity can be monitored, and potentially relevant applications can be displayed for selection in a convenient manner.

One option for identifying applications for surfacing to a user can be to identify applications based on a location entered into a browser address bar, such as a URL. Another option can be to identify applications for surfacing based on the content of a web page that is currently being viewed in a browser. If an application is surfaced that is of interest to the user, the application can be selected by the user for purchase and/or launch. Optionally, an application can be launched using the context that resulted in surfacing of the application.

General Description of Applications (Apps)

Embodiments of the present application introduce technology for discovering applications that relate to addresses for network document locations entered by a user and/or that relate to the content of the network documents. The terms "applications" and "apps" are used interchangeably herein and broadly pertain to application software designed to be executed by an operating system hosted on a computing device and to assist the user in performing a singular or multiple related specific tasks. In operation, apps can provide digital solutions in the real world, such as word processing, gaming, communication-based interfaces, etc. Examples of apps can include enterprise software, accounting software, office suites, graphics software, and media players. These apps, or application software, can be contrasted with operating system software or middleware, which manage and integrate a computer's capabilities, but typically do not directly apply the computer's capabilities in the performance of tasks that benefit the user. It should be understood and appreciated that the definition of apps is not limited to the scope of examples provided herein and may include any code that carries out one or more operations when executed.

Initially, embodiments of the present invention can involve building and maintaining a registry of apps that may be mapped in some manner to network addresses (such as URLs). The registry of apps can further be mapped in some manner to the documents that correspond to network addresses. This registry may be maintained in a data store and indexed via an application manifest, such as a manifest which is accessible to search engine(s) and/or database search programs. Various criteria or attributes of the network addresses and corresponding page content may be used to identify one or more corresponding apps. In one instance, an attribute may be a uniform resource locator (URL) or another type of network address that is entered into the address bar of a browser. A network address can be entered when a user types the address, when a user clicks on a link on a web page, when a user selects a bookmark from a stored list of addresses, or an address can be entered in any other convenient manner. In another instance, a criterion may be a declaration provided by an app developer that points to one or more categories of web content (e.g., entities or entity classes) that are previously deemed relevant to the app. In yet another instance, attributes of a document at a network address may be extracted from the document's title, description, and/or metadata, while a service may be employed to construct links between these attributes and various apps. That is, in embodiments, terms or phrases from content of a web page may be applied to discover relevant apps, as opposed to simply using terms and phrases from the network address itself.

One option for identifying relevant applications for a network address and/or document can be to build a search query for relevant apps based on the address or document. During a browsing event (e.g., upon receiving at least a portion of a network address in the address bar of a web browser), a search query for apps can be constructed by extracting words, phrases, or other tokens from the network address and/or document. The query can then be compared against the application manifest in order to discover relevant apps. This query can be compared with the application manifest using conventional search engine technology, or any other way of providing a ranking for applications relative to a network address and/or document can be used. By way of example, a protocol that operates similarly to a domain name server (DNS) technology may be utilized for locating, downloading, and installing applications on the user's device. In this case, the protocol can employ terms or phrases parsed from the network address, or underlying website, to conduct an online search for apps (e.g., app database, app catalogue, or app store), or perform a local search within an inventory of installed apps on the user's device. The highest ranked apps can then be surfaced to the user. In one embodiment, placement can involve presenting a representation of the app proximate to the address bar, optionally with an indication to the user regarding the rationale for selecting the app. In another embodiment, placement can involves exposing the app in a pop-up window on top of content within a web page when a term or phrase is selected within the content. Other embodiments are described herein, which provide non-limiting examples of schemes for surfacing the apps to a user in a browser or more generally in a GUI.

Upon detecting a user-initiated selection of a surfaced application, one or more actions may occur. For instance, if the app is not recognized as residing or being installed within the inventory of the user's device, the user can be redirected to an app store, thereby prompting the user to purchase the relevant app. Alternatively, the interface for the app store can be presented in a separate browser window or tab. However, if the app is recognized as being listed in the device's inventory (i.e., previously installed on the device), the app can automatically be launched. In this way, the user is saved the steps of manually locating and starting the app. In an exemplary embodiment, these actions may be offered as options that are visually presented near a representation of the app that is surfaced.

In the instance that the app is launched, context of the network address and/or document may be passed to the app for current or future use. This context may be passed as parameters that represent various aspects, such as content of the document, keywords extracted from the address using a template, the user's browsing and/or link-selection history, user profile data, or other user profile information.

There are a variety of ways these parameters may be passed into the app. In one instance, the parameters may be tailored based on expectations of the app. By way of example, the browser or operating system can be enabled to recognize an appropriate format that each individual app prefers when receiving parameters. Any keywords, such as keywords extracted from the network address or associated metadata, can then be formatted to correspond with a predetermined input structure of the app. This process of parsing and characterizing enables either the browser or the app to efficiently populate the appropriate terms into appropriate entry locations of the app's input structure.

Although various different approaches for passing parameters (representing context of a user's search) have been described, it should be understood and appreciated that other types of suitable ways of passing parameters that guide an app to an entry point may be used, and that embodiments of the present invention are not limited to simply parsing, categorizing, and populating as described herein. For instance, if an identifier (ID) of a business is extracted from a network address or document, a specialized URL associated with the business ID may be discovered and provided to the app, where the specialized URL may guide the app to launch at a entry point relevant to the business.

Detecting Location (URL) in Address Bar

One option for identifying applications to present to a user can be to select applications based on a networklocation from an address bar, such as a browser address bar. Here, and address bar refers to any interface that allows a user to enter a network address that a user intends to visit or browse. An address bar further refers to any field that reflects a network address for a document being displayed, even though a user may not be able to modify the display field. The network location can be a URL, a URI, a directory path for a folder on a storage drive, or any other type of text entered into the address bar. The information in the address bar can be used after being detected or captured. Any convenient method for detecting location information from the address bar can be used.

In some environments, detection and/or capture of address bar information can be facilitated by the browser. For example, with regard to desktop and/or laptop computers, a browser such as Internet Explorer® can provide an application programming interface that allows other programs to listen for information that is entered into the address bar. Information entered into the address bar can include information typed by a user, information that is placed in the address bar when a user clicks a link, or any other information that appears in the address bar to direct the browser to a network address and/or to reflect a network address that the browser is accessing. When information is entered into the address bar, the information can be made available to any other application or program that desires the information. This functionality can be part of the browser, or the functionality can be part of a plug-in for the browser. Alternatively, a browser that is integrated with an operating system may be structured so that the operating system provides address bar information, as opposed to having the browser provide the information. It is noted that some browsers can have functionality for providing suggested network locations based on partial entry of information into an address bar. These network addresses based on partial information can also be captured and used for surfacing applications while a user is typing a full location.

In various embodiments, one or more characters (such as a plurality of characters) having a network address format can be detected in an address bar (such as an address bar of a browser). A network address format can correspond to a plurality of characters that can be parsed by a browser and/or a search engine to identify a corresponding network location. This is in contrast to a plurality of characters cannot be parsed to identify a network location. Additionally or alternately, this can be in contrast to a plurality of characters that a browser recognizes as being in a format that does not correspond to a network address. For example, a format that corresponds to a network address can be a format that begins with the initial characters of a registered scheme, followed by characters identifying a network location according to the registered scheme. A registered scheme can refer to a scheme registered under a recognized protocol, such as a scheme registered according to RFC 4395. The "http", "ftp", and "https" schemes are examples of schemes registered according to RFC 4395.

Additionally, a plurality of characters without an initial scheme designation can also correspond to a registered network format. For example, many users omit the "http" when entering a network address. Instead, users often simply start typing the address itself, such as "microsoft.com" or "www.microsoft.com". In a browser address bar, a typical browser can recognize that the scheme "http" is implied by this type of character entry, and therefore this type of entry of characters by a user also corresponds to characters in a network address format corresponding to a registered scheme.

Characters having a network address format can be in contrast to private schemes that are not registered. For example, a browser script language can be used to allow a browser to detect a private format. A private format can superficially resemble a registered format. Alternatively, a private format can allow a browser to detect an initial keyword, such as "go" or "app". Upon detecting the initial keyword, the browser does not handle entered characters as a network address. Instead, the characters entered into an address bar can be routed to a separate or private protocol handler.

In other environments, a browser may not directly provide a function that allows for detection of information that is entered into an address bar. For example, mobile phones and other handheld devices can sometimes include a browser with a more limited set of features. In an environment where a browser and/or the operating system does not have functionality for listening for address bar locations, an application can be used to detect information entered into the address bar. For example, this could be done by listening for outbound requests by the operating system for "http" locations.

Still another option can be to capture address bar location information before, during, or after entry of the information into the address bar. For example, if a user selects a bookmark from a list of stored network locations, the selection of the bookmark can be detected. Another option can relate to a "shortened" URL. A variety of services are available for providing shortened versions of URLs. These shortened versions can be used, for example, in situations where typing a long string of characters is inconvenient. When a shortened URL is converted to the full location, the full location can be detected.

Parsing URLs and Use of Parsing Templates

After capturing network location information (such as a URL) from an address bar, the location can be parsed to allow for identification of one or more applications related to the network location. An application can be explicitly related to a network document, or a relationship can be inferred after parsing the network address and/or document. When an application matching engine (such as a search engine) identifies an application, an identification for the application can be transmitted to a browser so that a link for the application can be surfaced to the user.

Some network locations (such as web sites) may have an explicit association with an application. This explicit association can be based on information from the web site or based on information from the application. For example, the metadata for a web site may associate an application with to the web site. This identification may be used in real time to identify the corresponding application, or this identification can be made ahead of time and stored for future use. Storing a list of applications and associated network locations in advance can allow for an application for an associated network location to be surfaced as soon as the URL is detected, as opposed to waiting for the metadata to be downloaded and analyzed. Alternatively, an application may identify a corresponding web site in the metadata for the application. This can similarly be used to build a list of associated applications and network locations, such as an application registry.

Another type of association between an application and a network location can be based on the domain name of the network location. Many network locations have an address that starts with "www.<domain name>.com". If an application is available that is named "<domain name> app" or "<domain name>.com app", there is a reasonable likelihood that the network location and the similarly named app are related. Based on this relationship, the similarly named application can be surfaced when a user enters an address that starts with "www.<domain name>.com".

The above can be an example of using a template to parse a location from an address bar to identify a potentially matching application. More generally, a variety of templates can be used to parse address information. Many URLs can conform to a know formats. For example, a URL can often include a domain name, a location suffix such as ".com" or ".edu", and additional path information after the location suffix, with separate parts of the path information being separated by one or more backslash characters. A URL or other address that has a known format can be parsed using one or more templates in an effort to identify a relevant application.

In the example above, a simple template based on capturing the <domain name> from the address was used to identify a relevant application. Another type of template can be based on parts of an address located after a backslash. The URL can be parsed so that the domain name, the location suffix, and/or one or more terms located after a backslash can be extracted for use in identifying an application. The one or more terms located after a backslash can be located after the first backslash, a later backslash, or after a combination of different backslashes in the URL. More generally, in various address formats, a template can take advantage of any character or group of characters used as a delimiter to extract terms for use in identifying an application.

As an example, some social networking sites have interfaces to allow a user to interact with other content, such as information about movies. A user that is logged in to the social network site might access this content via an address of www.<social network>.com/<movie information site>. In this situation, even though the domain name may match a known application, the user's intent here is more likely to be related to the movie information site. Using a template, the keyword after the first backslash can be compared with known applications. If a match is found, the application matching the keyword after the backslash can be surfaced. In a more specific type of template, the template could also require that the domain name of the address matches a known social network site domain. Additionally or alternately, both the app corresponding to the domain name and the app corresponding to the movie information site can be surfaced to the user. The order of the display of the surfaced apps can be controlled based on a ranking and/or based on categories, as described below.

Use of a template can simplify the identification of relevant terms or tokens within an address. The terms or tokens can be referred to as keywords. A keyword can be any group of one or more characters that is identified or extracted as a potential separate term for use in identifying an application. It is noted that if keywords are extracted at a point where a user is still entering an address, one or more keywords may represent a partial term. Such partial terms can be expanded to form an expanded keyword using any convenient method. Additionally or alternately, a URL (or other address) can be parsed into keywords, and the keywords can be used to form a search query. The search query can then be used to automatically perform a search to identify relevant applications. Note that a template can be combined with using keywords to form a search query. For example, a network address for a search engine page related to a specific keyword search may include the search terms in the address. A template can be used to extract the search terms from the address. The search terms can then be modified to create a search that is focused on identifying applications, such as by adding the term "app" to the search.

Page Content and Entity Detection for App Matching

Another method for identifying relevant applications can be based on the content of a web page. A variety of methods can be used to match page content with an application. One example can be to identify applications that match URLs or other network addresses that are included in a web page. These URLs can be analyzed in the manner described above to identify relevant applications for display to a user. Any applications explicitly mentioned on a page can also be surfaced.

Another example can involve analyzing the content of a page to identify keywords. This can potentially be similar to analyzing page content for indexing as part of an inverted index of a search engine. Extracted terms can be selected based on frequency of appearance, location on the page, or any other convenient feature. The extracted terms can then be used to match keywords in metadata for an application and/or to construct a search for applications.

A variant on analyzing the content of a page can be analyzing a page for entity detection. Entities can represent people, places, or things that are searched for and/or encountered frequently enough in web content that the entities can be identified in advance. Applications can potentially be associated with such entities. For example, a page can have a content of several songs from a famous singer, such as Elvis Presley, with possibly only one mention of the singer's name. A keyword analysis of the page could suggest an application related to music generally, such as an application that provides lyrics to songs. However, entity detection can lead to identification of the entity Elvis Presley, in part based on the fact that song titles of a singer can also be used to identify the singer entity. This can lead to surfacing of an application related to the singer entity.

As used herein, the term "entity" generally refers to an abstract object that cannot be adequately managed through keywords. That is, abstract objects consider the context of a user's search event, which exposes the user's true intent, as opposed to employing just keyword-matching techniques, which do not always target the user's intent. Accordingly, entities may be logical objects that may be represented by a particular online description. These logical objects may be a person, place, thing, or any combination thereof. For instance, some examples of logical objects are the following: a particular movie; a restaurant on Castro Street in the city of Mountain View, Calif.; the CEO of Microsoft®; the Alaska Airlines' flight #AS331 from San Jose to Seattle; or a digital camera. In various embodiments, entities can be identified ahead of time. These predefined entities can have a list of corresponding associated characteristics. These associated characteristics can be used in identifying when a network document includes entity information.

App Categories and Ranking

Applications can be matched to a network address (e.g., URL) and/or the content of a document associated with the network address by a variety of methods. Some applications may be an appropriate match due to the application being the "official" app for a web site. Other applications may be generally related to the subject matter of a web site and have a high popularity. Still other apps can be displayed as promoted apps, where a party pays for the right to have an app displayed. Distinguishing between these application categories can be beneficial for a user. Indicating the nature of how or why an application is displayed in conjunction with a web page can assist the user in evaluating whether the application is desirable.

Matching of an application to a network address can be performed in any convenient manner. In some embodiments, a template can be used to assist in determining the relevance of the various portions of the network address for use as keywords. More generally, any convenient method for parsing a network address into keywords can be used. The keywords extracted from the network address can be used to identify matching applications. This can be done by identifying applications that contain one or more of the extracted keywords as metadata. The matching keywords can optionally be weighted, such as based on a term frequency—inverse document frequency value, or based on the template used to extract the keywords.

Matching an application to the content of a document can be more involved, due to the larger amount of content in a typical document relative to a typical network address. Any convenient strategy can be used to match document content to applications. For example, for matching of overall document content with an application, a list of representative keywords for a document can be generated. The representative keywords can be selected based on various factors, such as typical factors used for indexing documents for search. Thus, the representative keywords can be based in part on the frequency of occurrence of keywords, the term frequency—inverse document frequency values for keywords, weighting factors based on the location of keywords in the document (e.g., title, first line), or other factors. The representative keywords can then be used to identify matches with applications. Other matches based on document content can be based on identification of an entity in a document. The entity can then be used to identify relevant applications. For matching to a visible portion of a document, the match will typically be made in real time. To facilitate this, matching to a visible portion of a document can be limited in some embodiments, such as by limiting application matches to matches based on explicit mentions of an application. Another option for matching to a visible portion of a document can be to determine a list of ranking values for applications relative to the total page content. The content visible in the display device at a given time can then be compared to a subset of the ranked applications, such as comparing only to the top ten ranked applications based on overall page content. Still another option can be to limit application matches to matches based on entities that are detected within the visible portion of the document.

In various embodiments, applications can be associated with categories as part of the selection and/or display of the applications. One option can be to use categories to assist with display of applications. After one or more applications are selected as being suitable for display, the applications can be associated with a category. The manner of display of the icon or link for the application can indicate the category. For example, the category of an application can be indicate based on a color for a border around the icon or link. Another option can be to have category information available as a pop-up information box when a user hovers a mouse pointer over an application. Still another option can be to use the position of display of an application as an indicator of category.

Additionally or alternately, categories can be used to assist in selection of applications for display. In this type of embodiment, applications that potentially might be displayed can be associated with categories. The applications surfaced to the user can then be selected so that the top application or applications from each category can be selected. To facilitate association, an initial ranking of applications relative to a web page can be performed. The applications with a rank above a first threshold can then be associated with categories. Selection of applications from each category can then be based on the same threshold, or another threshold and/or other criteria can be used. Optionally, this can result in display of some applications that are lower ranked than other applications that are not surfaced to a user. For example, the top ranked application in one category may be displayed but still have a lower ranking score than non-displayed applications in another category.

Any convenient number or type of categories can be used when associating an application with a category. One example of a category can be a category for "official" apps. This category can represent an application that is explicitly mentioned by a web site and/or explicitly mentioned in metadata for the web site as being the application corresponding to the web site. Optionally, this type of category could also include applications where the name of the application matches the domain name of a web site.

Another type of category can be a category for contextual applications. Contextual applications can correspond to applications that match a web location based on one or more features of the network address and/or the content at the web location. The context relationship can be a direct relationship or an indirect relationship. A direct contextual relationship can correspond to an application that matches a web document based directly on a feature of the location or content. One example can be an application that is matched to a web site based on using a template to parse the URL. If the name of the application corresponds to, for example, one of the terms after a backslash in the URL, the application can have a direct contextual relationship. Alternatively, an application that specifies a web site as part of the metadata for the application can have a direct contextual relationship. Still another example can be a web site where it is determined that the web site is associated with an entity, such as a singer. An application with a direct contextual relationship can be an app related to the singer. By contrast, an application generally about music or music lyrics can be considered as an application with an indirect contextual relationship. More generally, other applications that are sufficiently related to a web site that the app could be surfaced, but that lack a specific relationship to the web location, can be considered as having an indirect contextual relationship.

Still another type of category for an application can be a recommended category. A recommended category can correspond to an app recommendation provided by a browser or other component. For example, a web site that is generally about movies may have a number of movie-related apps that could be considered as indirect context applications. If a ranking scheme is used, one of the movie-related apps can be considered the highest rated. This could be based on overall popularity of the app, or based on the details of how the movie-related apps are ranked relative to the web site, or other criteria can be used. This highest rated app can be provided as a recommended app when the user accesses the corresponding web location.

Yet another type of category can be an associated application category. An associated application can represent an app that is not related to the content of the current web site, but that users commonly access in conjunction with web sites of the current type. For example, analysis of prior network traffic may indicate that a user accessing a movie ticket web site are likely to also visit a restaurant reservation web site. A restaurant reservation app can be displayed as an associated app when a user visits a web site that handles movie ticket purchases.

Still another type of category can be a category for promoted applications. A promoted application can represent a form of advertising for an app. A promoted application can be surfaced to a user when a third party agrees to pay a fee for having an application surfaced. In some situations, the promoted application can be displayed when a particular web site is visited. Other types of promotion schemes can involve displaying an application when a web site with a particular type of content is visited. Any other convenient correlation can also be used for displaying a promoted app based on an agreement by the third party to pay a fee in exchange for display of a link or icon for the app.

It is noted that an application may potentially be associated with more than one category. In this situation, a category for association with the application can be selected in any convenient manner. For example, the category resulting in the highest score for the app can be chosen, or there can be a hierarchy of categories, so that an application is assigned to the category that is highest in the hierarchy.

Upon identifying a group of relevant apps, the identified apps may be ranked according to any metrics that can be used to sort and/or organize information. Generally, this can involve ranking apps in relation to other apps using such metrics as popularity of the apps, where popularity may be derived from various sources. These sources used for ranking may include specific services, such as social networks, recommendations from other users, crowd-source ratings, and reviews. Upon establishing the ranking, a threshold that limits the number of apps to the highest ranked apps (e.g., specific level of relevance) may be implemented. In one instance, the threshold is based, in part, upon space allocated on a search-results page for apps. In some embodiments, if no application has a sufficiently high ranking, then no apps are surfaced for that network address/page. Additionally or alternately, the evaluation of apps can be by category. If a category does not include an application with a sufficiently high ranking, no apps can be displayed for that category.

App Personalization via Filtering

In various embodiments, the applications surfaced to a user can be filtered based on one or more factors to personalize the displayed applications. The filtering can be performed based on a user profile, a user location, a prior history of interaction with applications, or a combination thereof.

A user profile can be used to filter applications for surfacing. A user's likely interests can be used to select applications that are more relevant for the user. Some profile information that can be useful for filtering applications can be similar to information used for surfacing context based search results. This can include information about a user's age, gender, profession, interests, or any other information that might be available in a user profile. Other information can include information related to the past browsing activity of a user. An application associated with a web site that is frequently visited by a user and/or that has been bookmarked by a user can be given preference over other applications. Still other user profile information could be based on recent browsing history, such as the web locations visited within the current browsing session.

Yet another kind of profile information can be temporal information. Temporal information can be combined with location information to provide additional context regarding the types of applications to surface. For example, when a user visits a weather related web site during daylight hours in the summertime from a coastal city, an application for surfing conditions could be surfaced in addition to applications for general weather. Visiting the same web site after dark could result in the surf report receiving a lower ranking. As another example, when a user visits a restaurant review web site during daylight hours in a metropolitan area, an associated application for traffic conditions can be surfaced. The same search during evening hours could instead give a higher ranking to an application for ordering a taxi or an application for theater shows or other social activities.

For mobile devices, user location information can be incorporated in the form of different profiles for different locations user location information from a user profile can be given a greater priority. A desktop computer or other computing platform that is typically used in one place may have a single physical location associated with the device. As a result, physical location can be a static portion of a user profile. A mobile device, however, may be used at a variety of physical locations. If the mobile device has a method for detecting current location, such as a GPS function, the current physical location information can be used to select from alternative profiles. For example, a user can define profiles associated with a home location, a work location, a school location, or other physical locations that a user commonly visits. When a user is browsing network sites, the mobile device can detect a current physical location and select a corresponding profile. Additionally or alternately, a number of standard user profile information sets can be used to modify how applications are ranked for surfacing based on location. For example, when a mobile device is detected as being at or near a shopping mall, applications related to shopping or price comparison can be given a higher ranking. When a mobile device is detected as being near a restaurant, applications related to restaurant reviews can be given a higher ranking. In some embodiments, detecting physical location information can be used to override the typical profile information for a user. A user that lives in Seattle, Wash. can have a corresponding location stored in the user's profile. When a mobile device is detected as being in another city, such as Los Angeles, Calif., the relative ranking importance of the location from the user's profile can be reduced, so that applications related to the current location can be surfaced in preference to applications related to the default home location.

Another filtering option can be to incorporate past interaction of a user with applications in selecting apps to surface. This type of filtering can include various factors. One option can be to preferentially surface to a user any relevant applications that a user has already purchased. This can remind a user of applications that may have additional functions that a user is not aware of. Another option can be related to a user's interactions with previously surfaced links for applications. If an application has been surfaced to a user more than a threshold number of times without the user purchasing and/or downloading the application, this can be an indication that the user has a low interest in the application. The ranking for this application can be lowered, so that another application can be surfaced. Alternatively, when a user purchases and/or accesses a surfaced application, any applications that are considered to be related can be given a higher ranking. A relationship between applications can be based on the applications addressing a similar subject, the applications being provided by the same author, the applications having an association with a particular network web site, or any other convenient type of relationship.

Still another type of filtering can be based on the platform associated with the applications purchased by a user. If a user has previously purchased applications associated with a particular operating system or device type, applications suitable for that operating system or device type can be given a higher ranking.

Viewing Enhancements: App Display Clusters and Pre-Fetching

In various embodiments, after an application has been selected for surfacing to a user, the application can be surfaced by displaying a link for the application. The link can be in the form of text, an icon, or any other type of feature that can allow a user to perform a selection action on the link. The link can be displayed in any convenient manner. For devices with sufficient display area, application links or icons can be surfaced by displaying the links as part of the browser. For example, links for surfaced applications can be displayed in one or more rows below, above, or otherwise in the vicinity of the address bar for the browser. The order of display of the applications in a row (or column) can indicate the relationship of the application to the web location. Thus, the first location in the app display row can correspond to an "official" app for the web site, the second location can correspond to a contextual app, and the third location can be a recommended app. Additionally or alternately, the links or icons can be displayed with an associated color to indicate the relationship of the application to the web site. For example, the icon or link can have a surrounding border of a color that indicates an "official" app, a recommended app, an associated app, or another type of app category.

Although it can be beneficial to surface one or more applications to a user, it can sometimes be desirable to limit the amount of display area used for surfacing apps while still providing as many apps to the user as possible. One option for increasing the number of apps surfaced to the user while reducing the amount of display space can be to display links or icons for groups of applications. A link for a group of applications can correspond to a group of applications that are related by subject matter. Alternatively, groups of applications can be based on the relationship category of the application relative to a web site. Still other application groupings can be arbitrary, such as having the first five highest ranked applications in a first group, then next five in a second group, and so on. In some embodiments, a link or icon representing a group of apps can include an indication of the number of apps represented by the link.

When a link for a group of applications is accessed, the link can be expanded in any convenient manner. Links or icons for the individual applications in the group can be displayed in the current browser, or in a new browser or pop-up window. Selecting a link for a group of icons can cause icons for other applications to be removed, or additional space can be created in the area where the application links are displayed to accommodate expansion of the group into individual icons.

Another method for enhancing a user experience related to surface applications can be pre-fetching of potential application information. Mobile computing devices can have varying levels of connection speed, depending on the type of available network. When a connection with a relatively high speed is detected, application information can be downloaded in advance. For example, a user may have a pattern of routinely visiting a series of web locations during a browsing session. After detecting that one location from the series has been accessed by the user, related application information for the other web locations can be pre-fetched.

Additional Display Options

Depending on the embodiment, various methods can be used to display a link for an application that is related to a web location. As noted above, one or more links can be displayed near the address bar for a browser, such as above or below the address bar. Another option can be to display links as a part or a modification of a web page. A link can be displayed on a part of a web page that led to the relationship with the app. For example, a web page that provides a review of various apps could be modified for display to include links for the each of the reviewed apps. The link could be located near the first mention of each reviewed app on the page.

In other embodiments, a link for an application (or a group of applications) can be included in the address bar. A possible location could be to include a link (such as an icon) as the last symbol presented in the address bar. In this type of embodiment, a link can be included in the address bar when an "official" app is available for a page. Another option could be to include a link in the address bar for the highest ranked app associated with a web location. Still another option could be to use an icon, such as a badge, in or near the address bar as a link for a group of apps. Accessing the link could then launch a separate window containing links or icons for individual apps, or the individual app links could be displayed in the frame of the browser.

In yet other embodiments, the amount of space available for displaying application links may be limited. For example, many mobile devices have screens with limited display areas. In such embodiments, one option for allowing apps to be accessible can be to provide an indicator on the display that related applications are available. A key input or a touch gesture can then be used to bring up a display of the applications. For example, a touch and drag motion (simulating turning of a page) could be used to make the displayed view appear to "flip over". This apparent flip side of the page can display one or more applications related to the web location. Alternatively, the new page containing applications can appear to slide into view, expand into view, or appear in any other convenient manner.

Example: App Display during Web Page Browsing

The following example describes surfacing of applications according to an embodiment of the invention. In the type of embodiment described in this example, the applications surfaced to a user can be refreshed multiple times as the user attempts to view a page at a single network location. This example will describe access to a fictitious web site with a network address of "www.reststops.org". If such a site existed, it could be a web site that describes the services available at rest stops on interstate highways in the United States.

In this example, a user is operating a general computing device. The computing device can be a desktop computer, a handheld mobile device such as a phone, or another type of computing device capable of accessing a network. The user can have a browser open. The user decides to engage in some planning for a cross country trip by car, and wants to investigate resources available on interstate freeways. The user starts to type in the network address "www.reststops.org". As the user types in "www.rest", the initial letters of the address are detected as they are entered into the address bar. Based on an algorithm for automatic completion of addresses, a network address including the word "restaurant" as the start of the domain name is suggested. The user has also previously purchased an application for making restaurant reservations. A link for this previously purchased application is shown in a space below the address bar. The link is shown in black text, indicating to the user that it is a previously purchased application. Based on the auto-complete guess of restaurant, and the user's prior history of purchasing a restaurant related application, an icon for a restaurant review application is also displayed. To the left of the icon is a dollar sign icon. In this example, the dollar sign indicates that the application would need to be purchased. The dollar sign and the icon are displayed in a green color, to indicate that this is a recommended application. In this example, the application is recommended based on the application being the most popular application related to restaurants.

The above can occur as the user is typing in the remaining portion of the network address. When the user finishes typing in the full domain name, the domain name is used to identify relevant applications. An official application matching "reststops" is not known. However, two applications in a database of application to network site correlations have "reststops" or "rest stops" as a keyword in metadata. Based on this domain match to metadata associated with an application, the two applications are identified as contextual applications. The links for the applications are displayed in blue to indicate the contextual relationship. As these apps have not been purchased, a dollar sign icon is included as part of the link.

In this example, the page corresponding to "www.reststops.org" has previously been crawled and indexed. Even though the page has not loaded into the browser yet, applications based on the content of the page can be surfaced based on the prior indexing. Based on the page content, a variety of additional applications related to interstate highway maps are also identified as potential contextual applications. The five highest rated contextual applications are selected for display below the address bar. Additionally, a link for a promoted application for locating gas stations is displayed in red. The links and icons related to restaurant applications are also removed.

After the page content is loaded, additional applications can be identified for display. The portion of the page currently in the browser includes a link to a web site containing a map of the interstate highway system. The domain name for this link matches the name for one of the interstate highway applications that have been identified. The icon for the matching application related to interstate highway maps can be moved from the display location below the address bar and placed adjacent to the web site link in the page content. The user then scrolls down the page, or translates the content of the page within the browser to reveal additional portions of the document. This reveals additional content, including a discussion of special features present in rest stops in Wyoming. This focus on Wyoming results in detection of "Wyoming" as an entity. As a result, a link for an application related to tourism in Wyoming is displayed near the first instance of Wyoming in the visible portion of the web page. Note that in this embodiment, the overall ranking of the Wyoming application does not result in a link or icon for the Wyoming app being generally displayed in the area below the address bar. Instead, the Wyoming app is displayed only when the corresponding subject matter is visible in the browser. Alternatively, any application that is displayed with material visible in the browser can be displayed in another area during times when the associated material is not currently visible. In addition to the new display of the icon for the Wyoming tourism application, scrolling the page down results in the interstate highway map link no longer being visible within the displayed portion of the web document. As a result, the app related to the interstate highway system is moved back to the area below the address bar.

Example: App Display Categories and Clusters

After finishing review of the web page related to rest stops, the user decides to visit a local coffee shop. The user takes a mobile computing device with him, such as a phone or tablet sized device. While at the coffee shop, the user accesses the (fictitious) social networking site "www.contact-my-friends.com" using a browser on the device. When the user types in the network address, initially the official app corresponding to the social networking site is identified. An icon indicating that the official app for the site is available is displayed next to the network address in the address bar.

A feature of the social networking site is that a different musical artist is promoted each week. The promotion sometimes includes discounts for purchase of music, so the user visits the promoted music area of the site by clicking a link. Because this is a regular feature of the social networking site, the link results in access of the network address "www.contact-my-friends.com/featuredartist". Based on a template, this path is recognized as being a promoted music section of the social network site. The social network site has a separate application associated the featured artist promotion. As a result, the icon for the official link is modified to reflect the featured artist application.

Based on the content of the featured artist page, other applications have a sufficiently high ranking, and therefore links can be surfaced for these sufficiently high ranking applications. However, due to the limited display space available on the mobile device, the remaining applications are provided or surfaced to the user via links or icons for application categories. The featured artist is recognized as an entity, which results in identification of a first group of applications related to the entity and/or songs performed by the entity. These entity related applications are represented by a single link. This link can indicate that entity based applications are being represented by any convenient method Another icon can be provided for a group of applications related to lyrics for songs. A third icon can provide a link to promoted applications.

Sample Operating Environments

Having described an overview of embodiments of the present invention, an exemplary operating environment in which embodiments of the present invention may be implemented is described below in order to provide a general context for various aspects of the present invention.

The following discussion describes various embodiments of the present invention. Note that several of the exemplary embodiments described below are based on current applications to make the discussion more concrete. However, aspects of the present invention should not be construed as being limited a particular application or platform that offers the particular application. That is, embodiments of the present invention may be designed to be applied to differing platforms (e.g., including PC, iPhone®, and Microsoft Windows®) and other various implementations of an application marketplace.

Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and nonremovable media. By way of example, and not limitation, computer-readable media may comprise computer storage media and communication media. Computer storage media include both volatile and nonvolatile, removable and nonremovable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium, which can be used to store the desired information and which can be accessed by computing device 100. In an embodiment, the computer storage media comprise tangible computer storage media. In an embodiment, the computer storage media comprise non-transitory computer storage media.

Communication media typically embody computer-readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
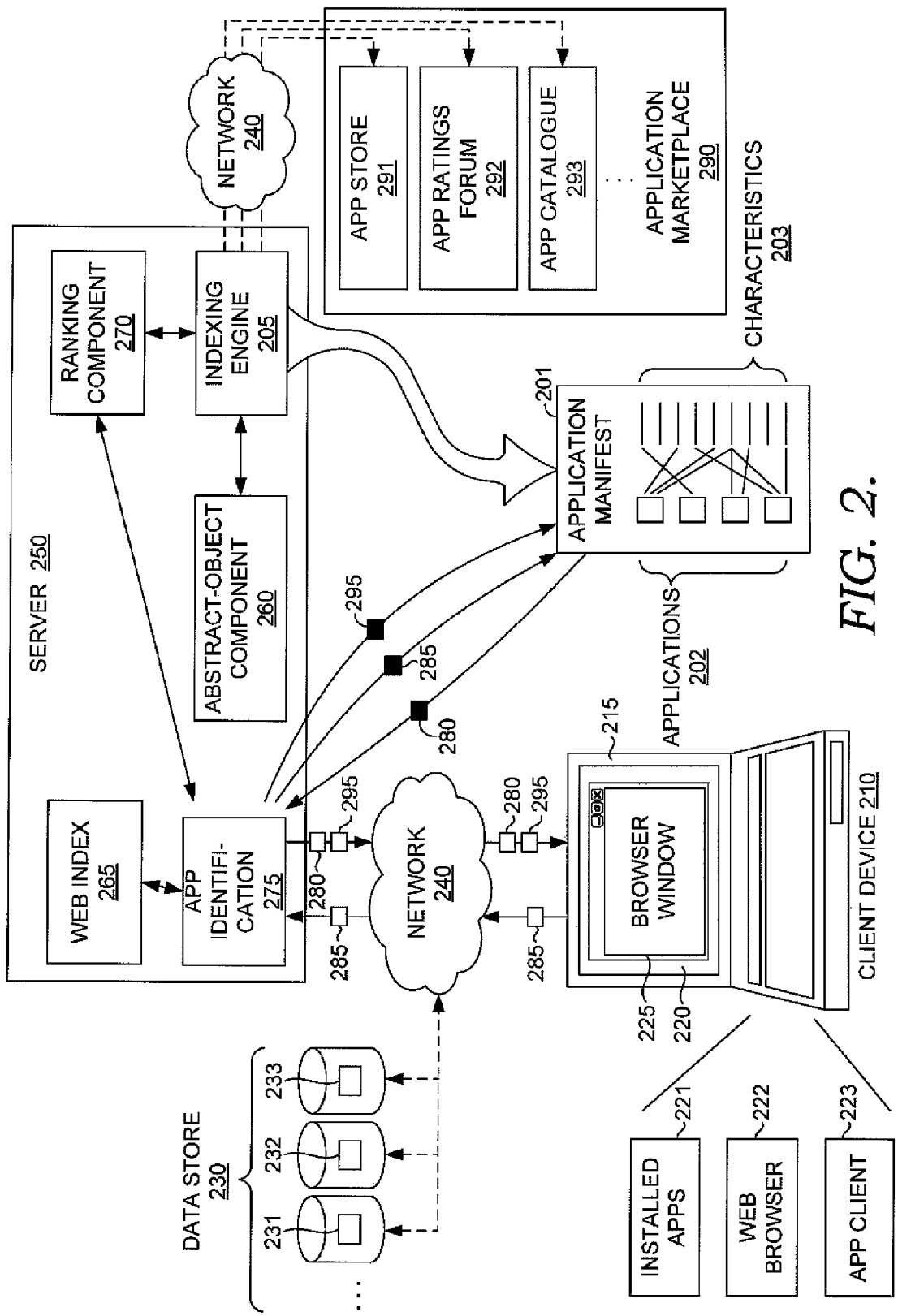
FIG. 2 is a block diagram of an exemplary system architecture of a distributed computing environment configured for use in implementing embodiments of the present invention.

Technology, introduced by embodiments of the present invention, for surfacing applications relevant to browsing activity will now be discussed with reference to FIG. 2. In particular, FIG. 2 depicts a block diagram that illustrates an exemplary system architecture 200 of a distributed computing environment, suitable for use in implementing embodiments of the present invention. Generally, implementing embodiments of the present invention relate to discovering apps related to a browsing session and presenting those apps to a user (e.g., rendering the apps in-line as part of the browser and/or as part of a modified web page). It should be understood and appreciated that the exemplary system architecture 200 shown in FIG. 2 is merely an example of one suitable computing environment and is not intended to suggest any limitation as to the scope of use or functionality of the present invention. Neither should the exemplary system architecture 200 be interpreted as having any dependency or requirement related to any single component or combination of components illustrated therein.

Initially, the exemplary system architecture 200 includes an application manifest 201, a client device 210, data stores 230, a server 250, an application marketplace 290 and a network 240 that interconnects each of these items. Each of the client device 210, the data stores 230, the server 250, and the application marketplace 290 shown in FIG. 2, may take the form of various types of computing devices, such as, for example, the computing device 100 described above with reference to FIG. 1. By way of example only and not limitation, the client device 210 and/or the server 250 may be a personal computer, desktop computer, laptop computer, consumer electronic device, handheld device (e.g., personal digital assistant), various servers, processing equipment, and the like. It should be noted, however, that the invention is not limited to implementation on such computing devices but may be implemented on any of a variety of different types of computing devices within the scope of embodiments of the present invention.

Typically, each of the devices 210 and 250 includes, or is linked to, some form of computing unit (e.g., central processing unit, microprocessor, etc.) to support operations of the component(s) running thereon (e.g., app identification engine 275, indexing engine 205, and the like). As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the devices 210 and 250 to enable each device to perform communication-related processes and other operations (e.g., accessing the data store 230 or discovering apps 202 within the application manifest 201). In another instance, the computing unit may encompass a processor (not shown) coupled to the computer-readable medium accommodated by each of the devices 210 and 250.

Generally, the computer-readable medium includes physical memory that stores, at least temporarily, a plurality of computer software components that are executable by the processor. As utilized herein, the term "processor" is not meant to be limiting and may encompass any elements of the computing unit that act in a computational capacity. In such capacity, the processor may be configured as a tangible article that processes instructions. In an exemplary embodiment, processing may involve fetching, decoding/interpreting, executing, and writing back instructions.

Also, beyond processing instructions, the processor may transfer information to and from other resources that are integral to, or disposed on, the devices 210 and 250. Generally, resources refer to software components or hardware mechanisms that enable the devices 210 and 250 to perform a particular function. By way of example only, the resources accommodated by the server 250 may include one or more of the following: an indexing engine 205; an abstract-object component 260; a web index 265; a ranking component 270; and an app identification engine 275. The presence of one or more of these resources may allow the server to act as an application matching engine. Alternatively, application matching can be performed by a search engine.

The client device 210 may include an input device (not shown) and a presentation device 215. Generally, the input device is provided to receive input(s) affecting, among other things, the network address and corresponding page that is displayed in a browser window 225, as well as any links for surfaced applications. Illustrative devices include a mouse, joystick, key pad, microphone, I/O components 120 of FIG. 1, or any other component capable of receiving a user input and communicating an indication of that input to the client device 210.

In embodiments, the presentation device 215 is configured to render and/or present the UI display 220 thereon. The presentation device 215, which is operably coupled to an output of the client device 210, may be configured as any presentation component that is capable of presenting information to a user, such as a digital monitor, electronic display panel, touch-screen, analog set top box, plasma screen, audio speakers, Braille pad, and the like. In one exemplary embodiment, the presentation device 215 is configured to present rich content, such as the browser window 225 that includes a display area populated with a network location requested by the user (e.g., digital images). In another exemplary embodiment, the presentation device 215 is capable of rendering other forms of media (e.g., audio signals). In yet another exemplary embodiment, the presentation device 215 may present a portion of a web page (e.g., descriptions of and links to websites) in proximity with representations of apps, as more fully discussed below.

The data store(s) 230 are generally configured to store information associated with data generated from current or previous browsing sessions. In various embodiments, such information may include, without limitation, recorded browsing behavior 231 (e.g., activity logs) of society in general, a log 232 of a particular user's tracked interactions with network locations, and other information 233 that pertains to embodiments of the present invention. In addition, the data store(s) 230 may be configured to be searchable for suitable access of the stored information. It will be understood and appreciated by those of ordinary skill in the art that the information stored in the data store(s) 230 may be configurable and may include any information relevant to identifying relevant applications based on browsing activity. The content and volume of such information are not intended to limit the scope of embodiments of the present invention in any way. Further, though illustrated as single, independent components, the data store(s) 230 may, in fact, be a plurality of databases, for instance, a database cluster, portions of which may reside on the client device 210, the server 250, another external computing device (not shown), and/or any combination thereof.

Accordingly, any number of components may be employed to achieve the desired functionality within the scope of embodiments of the present invention. Although the various components of FIG. 2 are shown with lines for the sake of clarity, in reality, delineating various components is not so clear, and, metaphorically, the lines would more accurately be grey or fuzzy. Further, although some components of FIG. 2 are depicted as single blocks, the depictions are exemplary in nature and in number and are not to be construed as limiting (e.g., although only one presentation device 215 is shown, many more may be communicatively coupled to the client device 210).

Further, the devices of the exemplary system architecture may be interconnected by any method known in the relevant field. For instance, the server 250 and the client device 210 may be operably coupled via a distributed computing environment that includes multiple computing devices coupled with one another via one or more networks 240. In embodiments, the network 240 may include, without limitation, one or more local area networks (LANs) and/or wide area networks (WANs). Such networking environments are commonplace in offices, enterprise-wide computer networks, intranets, and the Internet. Accordingly, the network is not further described herein.

In operation, the components 205, 260, 265, 270, and 275 are designed to perform a process that includes, at least, the steps of receiving a network address 285 from a web browser 222 running on the client device 210, identifying a corresponding document 295 based on network address 285, inspecting the application manifest 201 with characteristics 203 of the network address 285 and corresponding document 295 to identify apps 202 mapped thereto, and sending relevant apps 280 to the web browser 222 for presentation at the browser window 225. Initially, as illustrated in FIG. 2, the application manifest 201 typically includes a mapping between apps 202 and characteristics or keywords 203 of websites. These characteristics or keywords 203 may involve any known attributes of websites that may be identified for use in digitally linking those websites to the apps 202, as more fully discussed below.

In embodiments, the indexing engine 205 can be responsible for constructing and maintaining the application manifest 201. By way of example, constructing the application manifest 201 may involve crawling the application marketplace 290 for available apps 202 and associating the apps 202 with websites using characteristics 203 of the websites. Crawling the application marketplace 290 may comprise mining applications from such sources as an app store 291, an app ratings forum 292, and/or an app catalog 293. It should be understood and appreciated that other sources for accessing applications may be used, and the illustrated sources 291-293 do not represent an exhaustive listing. Further, the application marketplace 290 may vary based on an applications platform (e.g., Microsoft® Apps, Android®, and the like) running on the client device 210.

Typically, predefined entities may be indexed within the application manifest 201 as characteristics 203 that may be interrogated with one or more entities related to ongoing browsing activity. More generally, other characteristics can be indexed within the application manifest 201. An application surfacing component may derive one or more entities present in a document and convey the derived entities to the abstract-object component 260 that, in turn, compares the derived entity against predefined entities within the application manifest 201. Upon finding a match, the abstract-object component 260 may then identify the apps 202 mapped to the matching predefined entity and designate the identified apps 202 as candidates for presentation.

Once these characteristics 310 are identified from the network address and/or page content, apps 280 relevant to the characteristics 310 of the network address 285/document 295 are determined by employing the characteristics 310 to inspect the application manifest 201. A characteristic-matching component 276 (see FIG. 3) may be provisioned within the app identification engine 275 to inspect the application manifest 201 by comparing the characteristics 310 against the predefined characteristics 203 to find a matching app 280 as depicted at operation 420. As mentioned above, the indexing engine 205 of FIG. 2 is provided to mine apps 202, and to construct and maintain the mapping between the mined apps 202 and the predefined characteristics 203. In instances, the predefined characteristics 203 may comprise abstract objects that describe a respective intent of a user when implementing a search event.

In an exemplary embodiment, the characteristic-matching component 276 may identify keywords and/or entity information from the page content 295 and use the keywords and/or entity information to interrogate against the predefined characteristics 203 of the application manifest 201. In other embodiments, as discussed above, keywords from the network address 285 may be abstracted and directly used to discover relevant apps without the consideration of the page content 295.

Top-rated applications 330 may be selected from the relevant apps 280 by implementing the selection component 277. In one instance, the selection component 277 is configured for selecting relevant app(s) 280 returned from the characteristic-matching component 276 and for storing the app(s) 280 as a candidates for concurrent display with the initial set of search results 295. In another instance, the selection component 277 may be responsible for narrowing the relevant apps 280 to top-rated applications 330 by interacting with the ranking component 270. The ranking component 270, as more fully discussed above with reference to FIG. 2, serves to organize the relevant apps 280 based on one or more rating schemes and to limit the applications surfaced within the search results 295 based on at least one predefined threshold.

Figure 3:
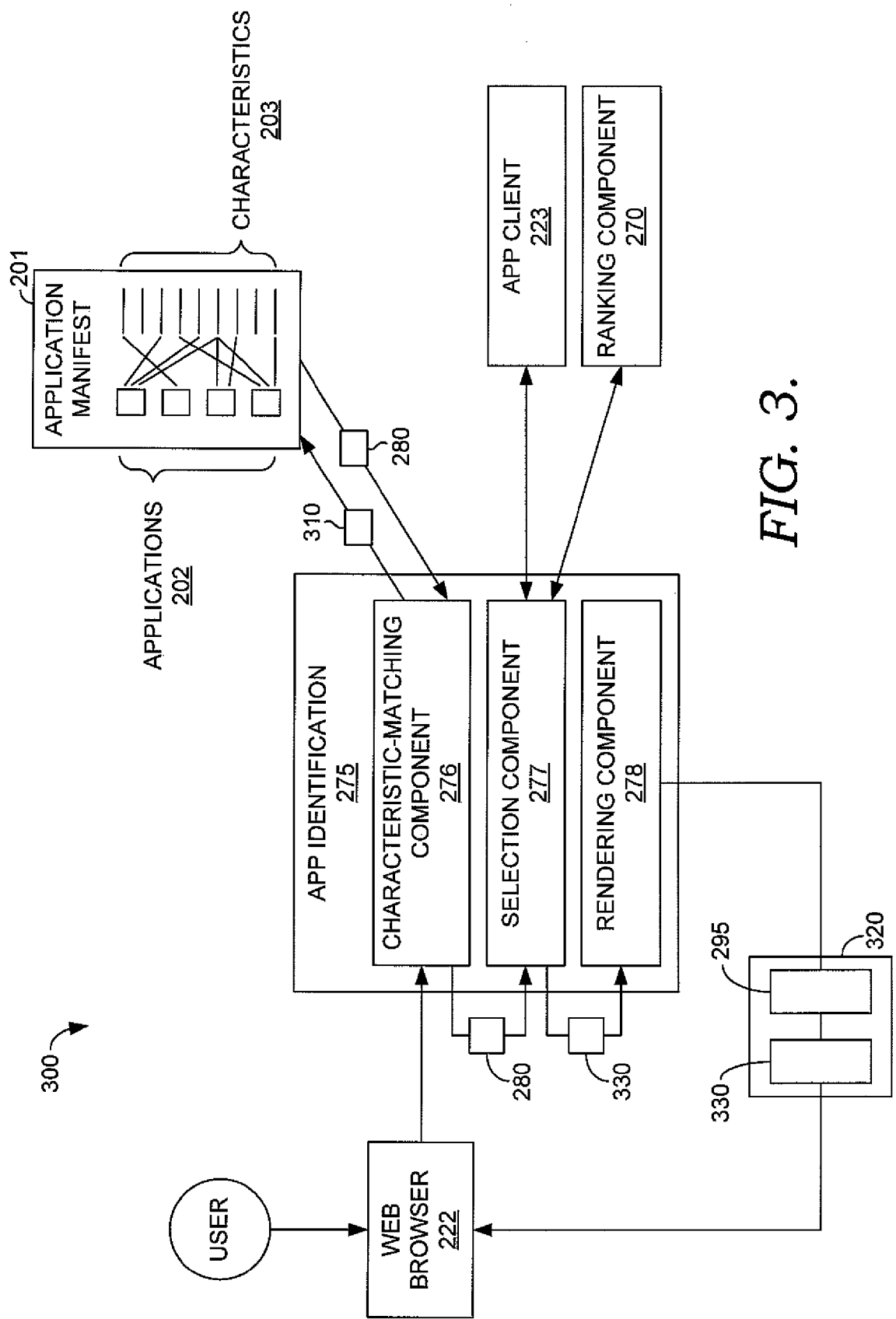
FIG. 3 is a block diagram of an inter-component communication scheme within the exemplary system architecture of FIG. 2, in accordance with embodiments of the present invention.

In yet another instance, the selection component 277 may interface with the app client 223 running on the client device 210, as illustrated at FIG. 3. The app client 223 may have access to the apps 221 installed at the client device (see FIG. 2). Accordingly, the app client 223 may help the selection component 277 to select the top-rated applications 330 from the relevant apps 280 based on the identity of the installed apps to 221 residing within memory of the client device 210.

In still another instance, the selection component 277 may be designed to compile or provided access to a log of user interactions accrued while the user is implementing the search event. Upon reviewing data persisted within the user-interaction log, the selection component 277 may compare information from the log against the predefined characteristics 203 of the application manifest 201 to discover relevant apps 280. Or, the selection component 277 may apply the log information to filter low-rated applications from the relevant apps 280.

In yet another instance, the selection component 277 may be configured to check ranking scale(s) (e.g., popularity-based rankings and/or relevance-based rankings) of apps to distill top-rated applications 330 from the relevant apps 280. These ranking scale(s) may be derived from any number of sources (e.g., the app ratings forum 292 of FIG. 2, data logged from general searching and/or downloading, app-centric blogs, articles, opinion posts, or other reputable sources) and may be employed to effectively dismiss from consideration those apps 280 initially determined irrelevant. For example, if a video game is returned as a relevant app 280, the selection component 277 may, in accordance with ranking scale(s), determine the main version of the video game as being top-rated while listing the remaining versions (e.g., holiday version, special release, and guides and tips) as lower-rated. As a result, a transmission 320 with the top-rated applications 330 may be conveyed for rendering at the web browser 222, while the lower-rated applications may be cached in case the user wants to surface additional applications upon inspecting the search results 295.

Turning now to FIG. 3, a rendering component 278 may be provided within the app identification engine 275 for placing a visual representation of at least one application in a location on a layout of a browser or in a location as part of a displayed document. The rendering component 278 can be enabled to place representations of the top-rated applications 330 within a browser or document as a function of one or more criteria. For instance, when the criteria indicates the real estate available within the browser or document is limited, the rendering component 278 may elect to restrict the number of top-rated applications 330 rendered at the search-result page. In contrast, if the browser is preconfigured with sufficient real estate, then the rendering component 278 may select additional top-rated applications 330 for display.

In another embodiment, the criteria used by the rendering component 278 to place representations of the top-rated applications 330 may involve a number of the top-rated applications 330 identified by the selection component 277. For instance, if only two top-rated applications 330 are identified, then just those top-rated applications 330 are sent via transmission 320 to the web browser 222 for display to the user.

In various embodiments, a selection of a link for a subject application may be received. The selection may comprise, for example, a user-initiated selection (e.g., mouse click or hover action) of the link. Upon receiving the selection of the subject application at the web browser 222, the web browser 222 may attempt to open the subject application on the client device 210. When the subject application is installed on the client device 210, the subject application is launched directly from the search-results page. However, when the subject application is not installed on the client device 210, the web browser 222 may automatically navigate the user to a website that sells the subject application (e.g., app store 291 of FIG. 2). Or, the app client 223 running on the client device 210 may automatically install the subject application thereon.

In an exemplary embodiment, as shown in FIG. 2, the app client 223 is designed to detect whether the subject application currently resides on the client device 210 by acting as an interface between the web browser 222 and catalogue(s) of the installed apps 221. Note that in some embodiments installed apps 221 can correspond or partially correspond to purchased apps. In one instance, the app client 223 is configured as a protocol handler and/or system-provided application programming interface (API). Upon an application being installed to the client device 210, the installed application is registered with the protocol handler. Thus, the installed application now can be launched by invoking a protocol known to the protocol handler. In operation, upon receiving an indication that a user has selected the subject application from the search-results page, the web browser 222 may convey the selection indication to the protocol handler (e.g., app client 223) that, in turn, issues an "open" command or invoke call to the installed apps 221. If the subject application is launched in response to the command, then the app client 223 understands the subject application is installed to the client device 210. If the subject application is not launched, then the app client 223 understands the subject application is not installed to the client device 210 and offers the user the option to download the application from the application marketplace 290. As such, by leveraging the protocol-handler capability of the app client 223, the detection of the subject application within the installed apps 221 is relatively efficient and does not require the acquisition of a list of the installed apps 221 for a labor-intensive lookup.

In one instance, the detection of applications that are installed to the client device 210 may be performed incident to adding the top-rated applications to the search results. In this way, the protocol-handler mechanism of the app client 223 may be invoked upon the web browser 222 receiving notification from the search engine 275 that one or more applications are selected for inclusion within the search-results page. The app client 223 may then inspect the installed apps 221 via any know process (e.g., detection using the "open" command) to determine whether the application(s) selected for rendering are actually installed on the client device 210. If so, the app client 223 may instruct the web browser 222 to modify presentational aspects of the application(s) being rendered such that the user is notified the application(s) were previously downloaded to the client device 210 (e.g., modifying the control button 525 to indicate that a click-action applied thereto will launch the application). If not, the app client 223 may instruct the web browser 222 to modify presentational aspects of the application(s) being rendered such that the user is notified the application(s) are not installed to the client device 210 (e.g., modifying the control button 535 to indicate that a click-action applied thereto will install the application).

Upon the user directing a selection to the subject application that invokes the subject application to launch, context (e.g., the user's interactions with the web browser 222 of FIG. 2) may be transferred to the subject application for establishing an advanced entry point, as opposed to a root entry point that is configured as the default start-up homepage for the subject application. This context may be, in certain circumstances, based upon user interactions with a browser and/or network documents. For instance, the browser may record the current and/or previous documents visited by a user during a browsing session and derive a context from the terms and phrases within the queries. This context may then be converted into parameters that are plugged-in to the subject application during launch, thereby taking the user directly to the contents, or advanced entry point, relevant to the query.

One way to derive context can include parsing at least one network address, such as by using a template, and using the keywords extracted from the network address to manipulate the launched application. For example, the URL "www.urbanspoon.com/Seattle/Bellevue/Italian-Restaurants" may provide a context when the user visits the document associated with the URL. In this case, the context indicates the user is looking for Italian restaurants in a location of Bellevue, Wash. at the indicated web site. This context can be converted to parameters and plugged-in to the Urbanspoon® application upon launch. With reference to the example above, the process of converting a network address into parameters may include recognizing an intent behind keywords and attaching categorizing indicators to the keywords, such as the following: domain=restaurants; cuisine=Italian; location=Bellevue; and task=reservation. Recognizing intent and attaching categories can be facilitated by using a template to parse the network address.

The process of plugging-in parameters to a launched application may involve the following steps: determining the proper information the application requires to navigate to an advanced entry point; and determining the format of the parameters that will likely be accepted by the application in order to properly interface with the user. For instance, an application may be designed to parse a raw, non-manipulated URL without the use of specialized parameters, thus, obfuscating the need to convert the context at the app client 223. In another instance, the app client 223 may be triggered to recognize a preferred format of the launched application in order to properly pass the context as parameters and in order to properly interface with the launched application. As such, the app client 223 may act to bridge a communication gap between the search-event context and launched application.

For example, if a user is obtaining information about a restaurant review from the site "www.yelp.com", the app client 223 may recognize that the Yelp® application requires pre-processing applied to the network address prior to passing data to the Yelp® application during launch. In this case, the pre-processing may include extracting a business identifier (ID) from the network address and passing the business ID of the searched restaurant to the Yelp® application for entry into an argument designated for the business-ID data type. As a result, the Yelp® application will launch to an advanced entry point that is associated with the identified restaurant.

Figure 4:
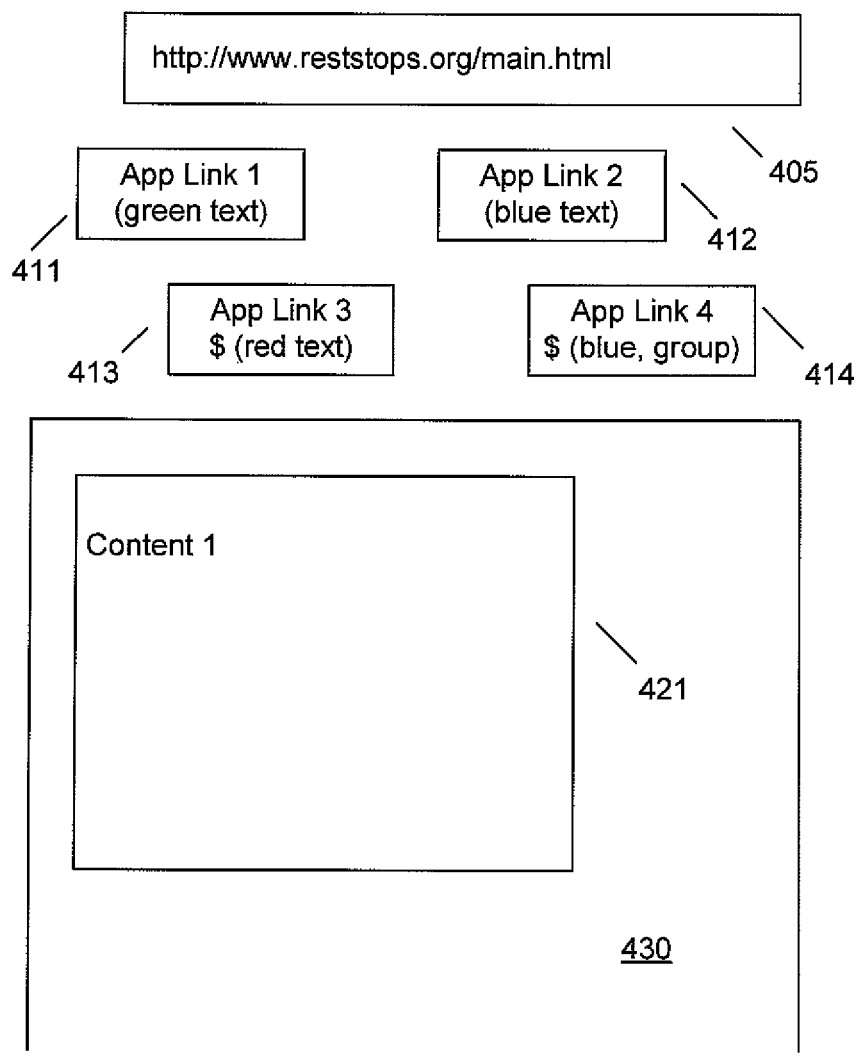
FIG. 4 schematically shows an example of a browser displaying a document and links to matching applications.

FIG. 4 schematically shows an example of a browser displaying a document corresponding to a network address, as well as links to applications that match the document according to an embodiment of the invention. In FIG. 4, the browser includes an address bar 405. The address bar contains a (fictitious) network address. A document 430 corresponding to the network address is also displayed in the browser. In FIG. 4, a first portion of content 421 of document 430 is currently visible. Based on the network address and the corresponding document, links for several apps matching the document are displayed. App links 411 and 412 correspond to apps that are already installed on the user device being used to display the browser. App links 413 and 414 represent apps that are available for purchase, as indicated by the dollar sign icon that is included as part of the link. In other embodiments, any other convenient method for indicating that an app is available for purchase can be used. In FIG. 4, the color used to display the text for the app link provides an indication of the relationship of the application to the document. For example, app link 1 (411) is displayed in green to represent that app link 1 corresponds to the official app for the domain name. In the example shown in FIG. 4, app links 412 and 414 in blue correspond to contextual apps while the red text for app link 413 corresponds to a promoted app. As noted in FIG. 4, app link 414 actually corresponds to a group of contextual apps that are represented as a group for convenience.

Figure 5:
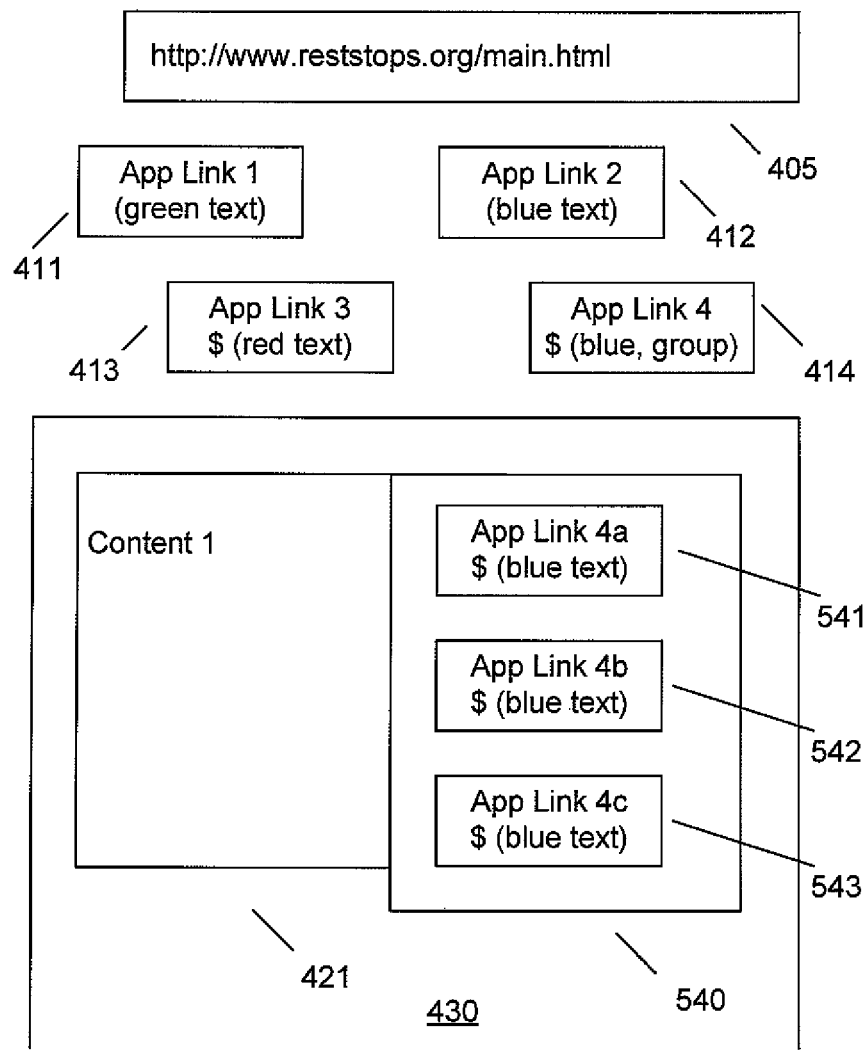
FIG. 5 schematically shows an example of a browser displaying a document and links to matching applications.

FIG. 5 shows an example of how the displayed view changes when a user accesses a link for a group of apps. If a user desires to access one of the plurality of apps represented by app link 414, a user can click on or otherwise access the link. As shown in FIG. 5, this can result in separate links 541, 542, and 543 being displayed for the individual apps. The separate links 541, 542, and 543 can also be displayed as part of the existing browser frame, or the links can be displayed in a separate window 540 as shown in FIG. 5. In other embodiments, any convenient number of apps can be represented by a group link.

Figure 6:
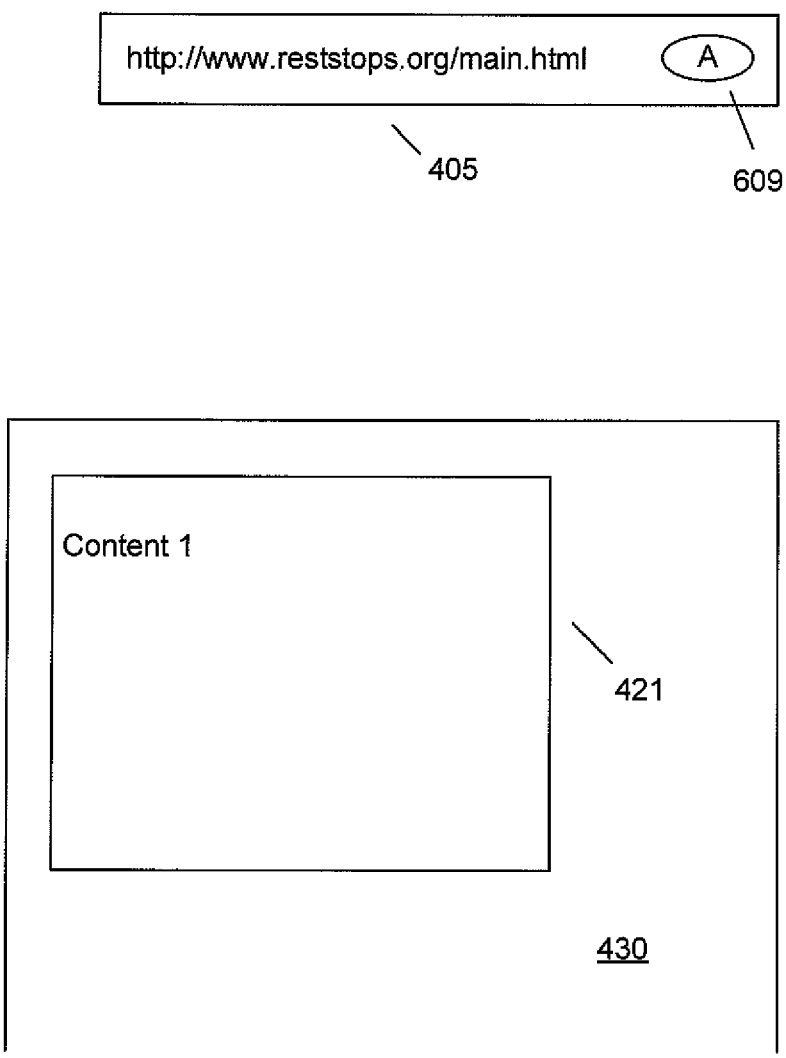
FIG. 6 schematically shows an example of a browser displaying a document and links to matching applications.

FIG. 6 shows an alternative embodiment where the amount of browser frame real estate is more limited. In this embodiment, the availability of applications matching a document can be indicated by an icon 609 in the address bar. Accessing the icon 609 can result in display of matching applications in any convenient manner, such as the separate window 540 shown in FIG. 5.

Figure 7A:
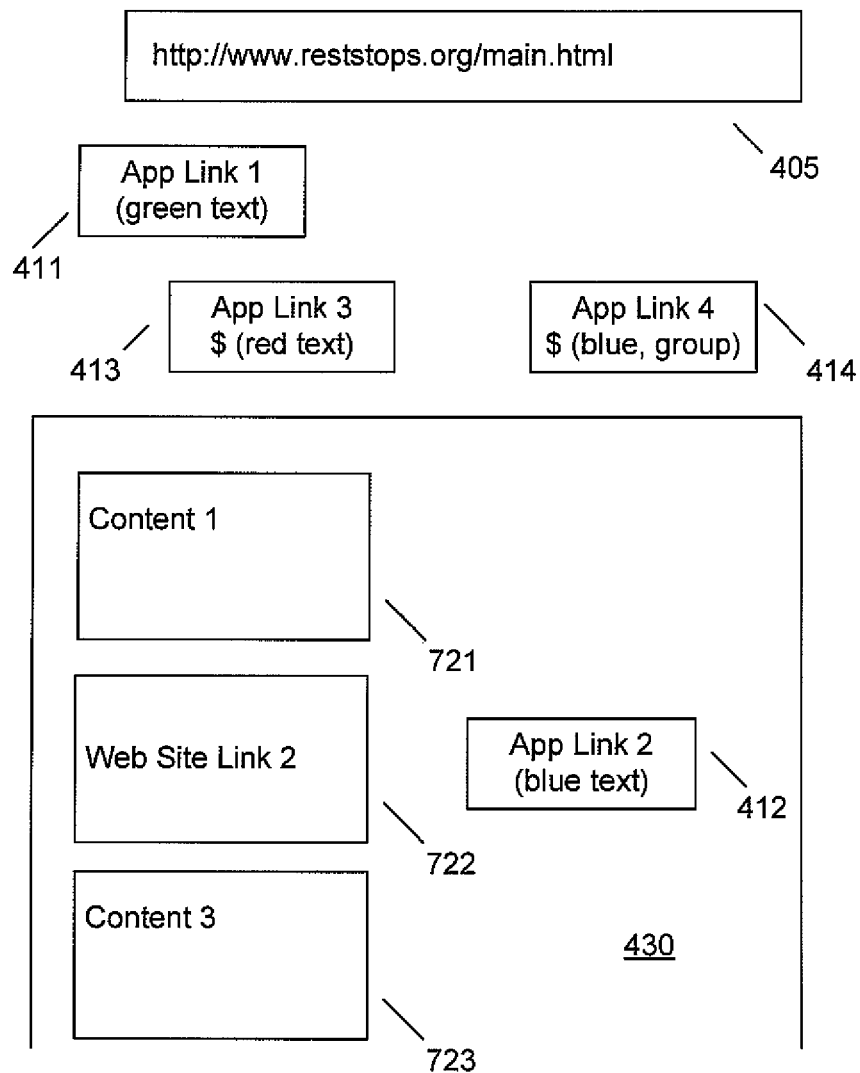
FIGS. 7a and 7b schematically show an example of a browser displaying a document and links to matching applications.
Figure 7B:
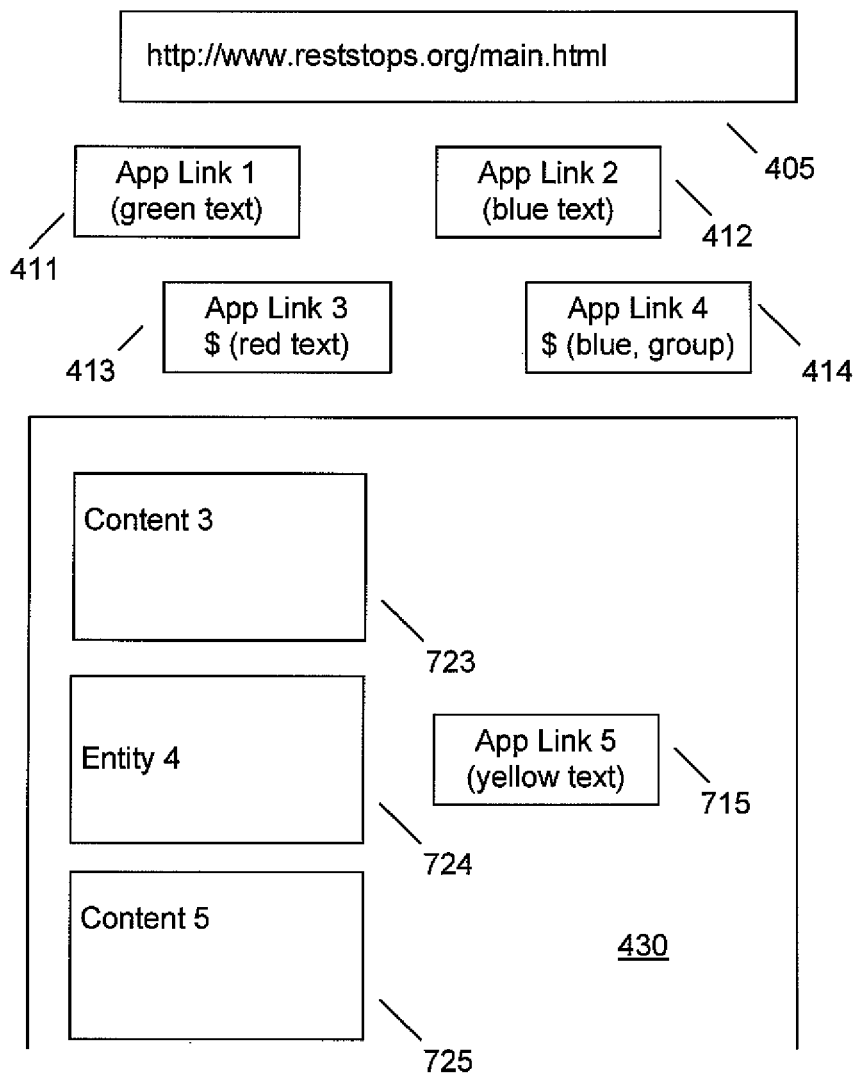

FIGS. 7a and 7b schematically show display of a document corresponding to a network address according to still another embodiment of the invention. In FIG. 7a, document 430 includes a first content portion 721, a web site link 722, and a third content portion 723. In FIG. 7a, app link 412 corresponds to the official application for web site link 722. As a result, app link 412 can be displayed in proximity to web site link 722.

FIG. 7b represents a view of the same document after a user has scrolled down in the document. In FIG. 7b, first content portion 721 and web site link 722 are no longer visible due to scrolling of the document. The visible portion of the document now includes third content portion 723, entity content 724, and fifth content portion 725. Because web site link 722 is no longer visible, app link 412 can be returned to the browser frame near the other app links. In this embodiment, app link 412 has a sufficiently high ranking that it is always displayed in conjunction with the document. Only the position of display for app link 412 changes. By contrast, app link 715 is not sufficiently highly ranked to be displayed at all times. Instead, app link 715 is only displayed when entity content 724 is visible in the display device. In FIG. 7b, app link 715 is displayed in proximity to entity content 724. App link 715 can represent an application related to the entity that corresponds to entity content 724.

Additional Embodiments

Figure 8:
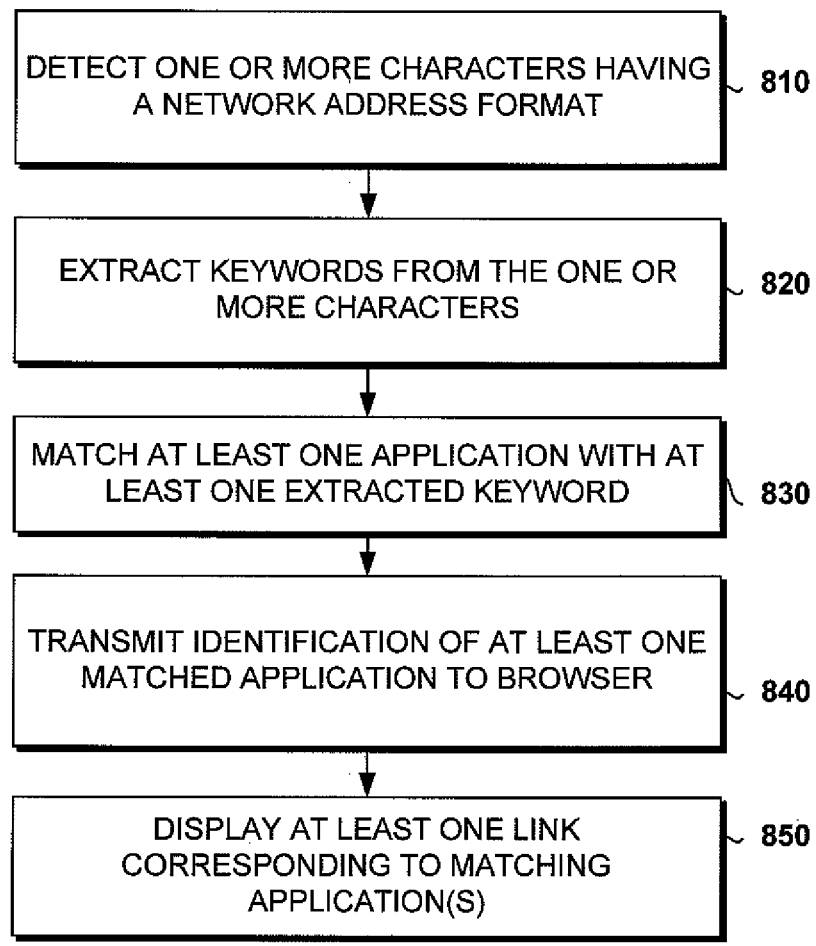
FIGS. 8-11 show flow diagrams of various methods according to embodiments of the invention.
Figure 9:
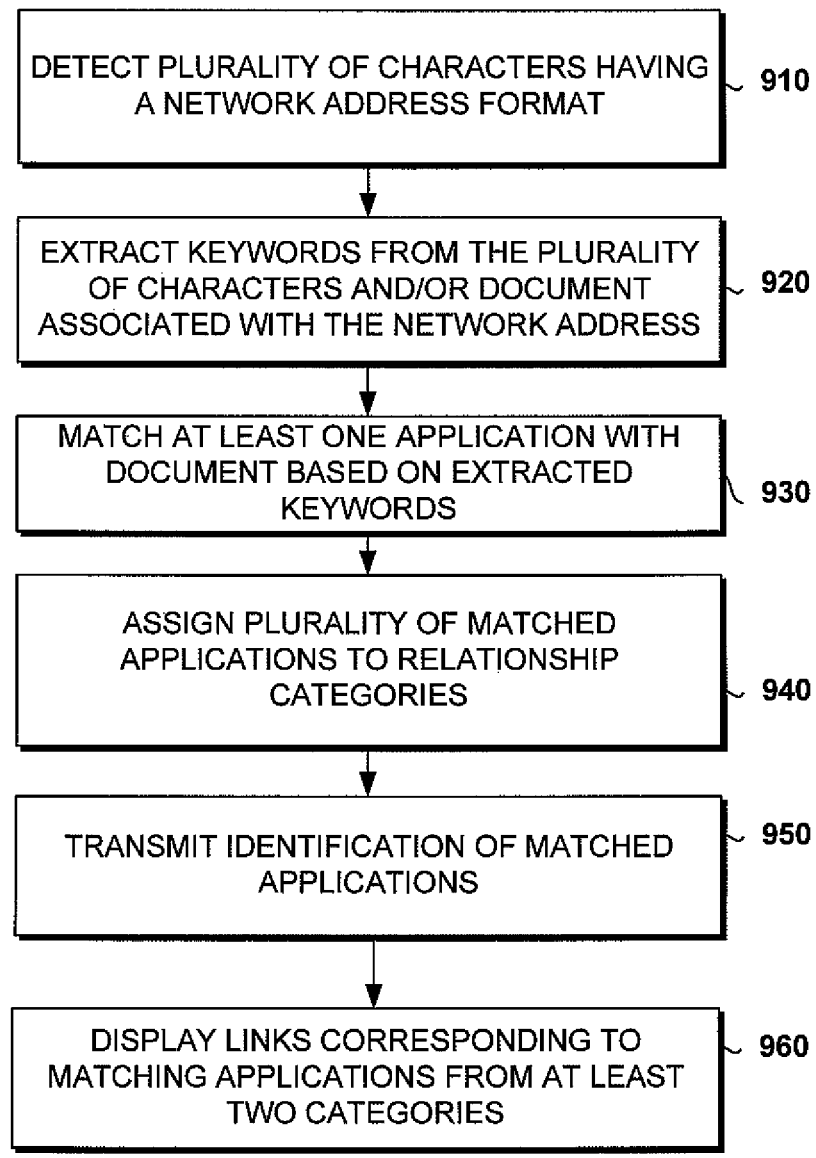

In an embodiment, a method for surfacing one or more applications based on browsing activity is provided. An example of such a method is shown in FIG. 8. The method can include detecting 810 one or more characters in a browser address bar, the one or more characters having a network address format. One or more keywords can be extracted 820 from the one or more detected characters. Optionally, after characters are detected, the characters can be forwarded from the browser to an application matching engine, such as a search engine. The extraction of the one or more keywords can then be optionally performed on the characters received by the search engine. At least one application can be matched 830 with at least one extracted keyword from the one or more extracted keywords. An identification of the at least one matched application can then be transmitted 840 to the browser. At least one link corresponding to the at least one matched application can be displayed 850 by the browser.

The method can include detecting 910 a plurality of characters in a browser address bar, the plurality of characters having a network address format. The plurality of characters can correspond to a document location. One or more keywords can be extracted 920 from the plurality detected characters. Optionally, after characters are detected, the characters can be forwarded from the browser to an application matching engine, such as a search engine. The extraction of the one or more keywords can then be optionally performed on the characters received by the search engine. Keywords can also optionally be extracted from a document associated with the document location. A plurality of applications can be matched 930 with at least one keyword extracted from the plurality of characters, extracted from the associated document, or extracted from a combination thereof. The plurality of matched applications can be assigned 940 to categories corresponding to the relationship of an application to the associated document. An identification of one or more matched applications and assigned categories can then be transmitted 950 to the browser. One or more links corresponding to matched applications assigned to at least two categories can be displayed 960, the displayed links providing an indication of the assigned category for the matched applications.

Figure 10:
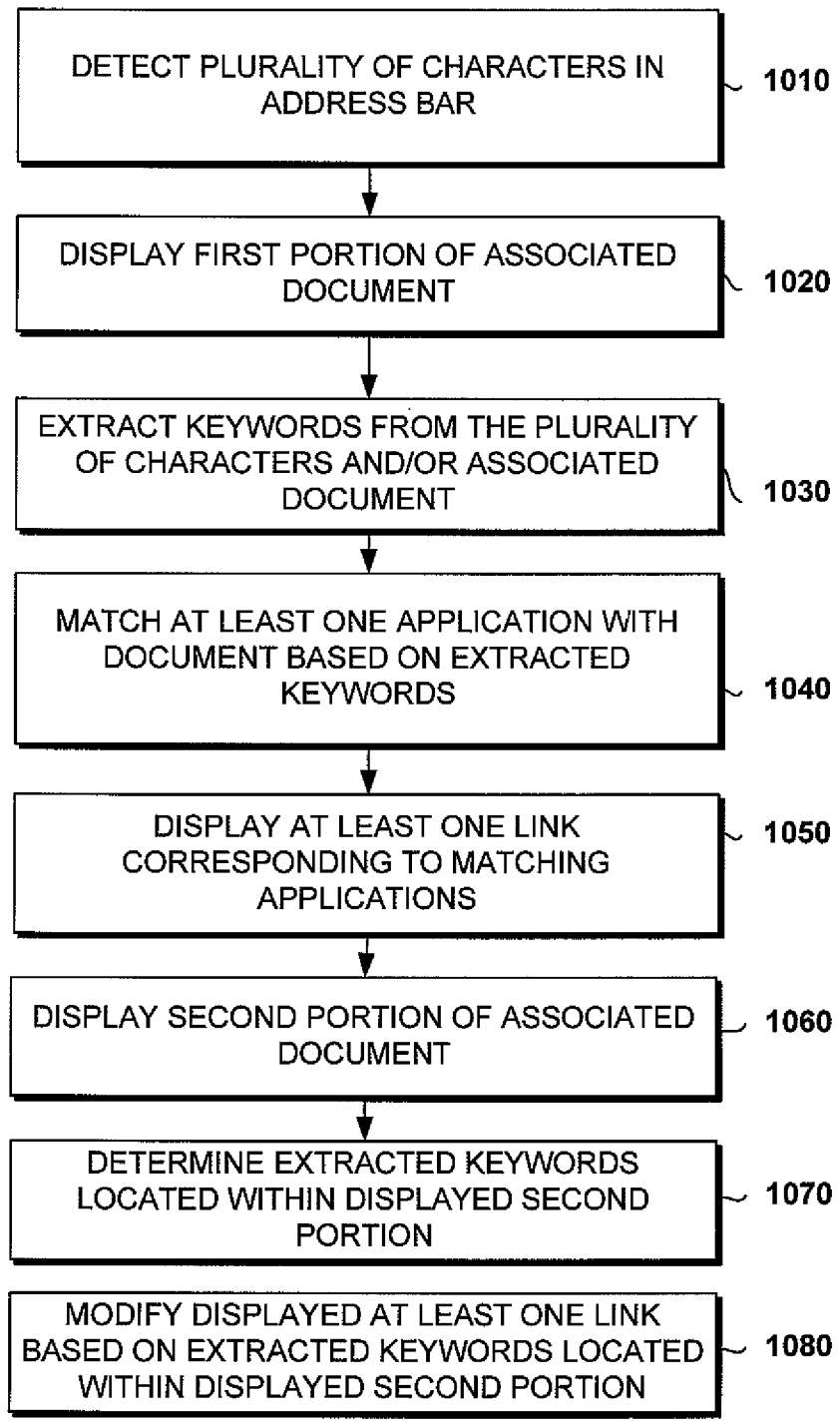

In still another embodiment, a method for surfacing one or more applications based on browsing activity is provided. An example of such a method is shown in FIG. 10. The method can include detecting 1010 a plurality of characters in an address bar, the plurality of characters having a network address format. The plurality of characters can correspond to a document location. A first portion of the associated document can be displayed 1020. Optionally, the plurality of characters can be forwarded to an application matching engine, such as a search engine. One or more keywords can be extracted 1030 from the plurality of characters, extracted from the associated document, or extracted from a combination thereof. At least one application can be matched 1040 based on the extracted keywords. An identification of this application can be transmitted by the application matching engine and received by the browser. At least one link can be displayed 1050 corresponding to a matched application. A second portion of the associated document can be displayed 1060. At least one extracted keyword located within the displayed second portion of the associated document can be identified 1070. The displayed at least one link can be modified 1080 based on the identified extracted keyword(s) located within the displayed second portion of the associated document.

Figure 11:
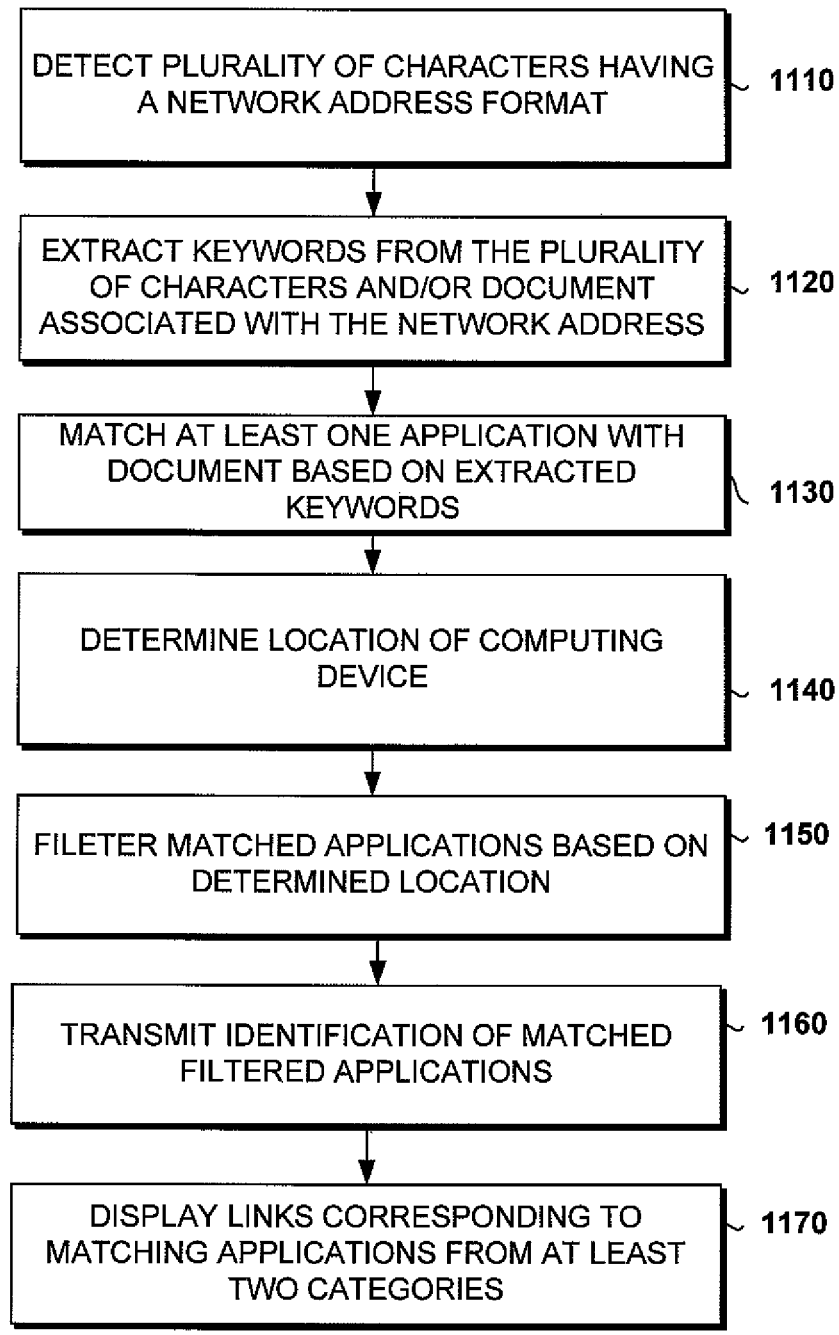

In an alternative embodiment, a method such as the method shown in FIG. 8 can be modified to incorporate location based filtering of applications. An example of such a method is shown in FIG. 11. The method can include detecting 1110 one or more characters in a browser address bar, the one or more characters having a network address format. One or more keywords can be extracted 1120 from the one or more detected characters. Optionally, after characters are detected, the characters can be forwarded from the browser to an application matching engine, such as a search engine. The extraction of the one or more keywords can then be optionally performed on the characters received by the search engine. A plurality of applications can be matched 1130 with at least one extracted keyword from the one or more extracted keywords. A location of a computing device corresponding to the browser can then be determined 1140. The plurality of matched applications can be filtered 1150 based on the determined location. An identification of the at least one matched, filtered application can then be transmitted 1160 to the browser. At least one link corresponding to the at least one matched, filtered application can be displayed 1170 by the browser.

In an embodiment, one or more computer-readable media having embodied thereon computer-executable instructions are provided that, when executed, perform a method for surfacing one or more applications based on browsing activity, the method comprising: receiving one or more characters corresponding to characters detected in a browser address bar that have a network address format; matching one or more applications with at least one keyword extracted from the one or more characters; and transmitting an identification of the one or more matched applications in response to receiving the one or more characters.

In another embodiment, a computer-implemented method is provided for surfacing one or more applications as a function of search results, the method comprising: receiving a plurality characters having a network address format, the plurality of characters corresponding to a document location; matching a plurality of applications with at least one keyword extracted from the plurality of characters, a document associated with the document location, or a combination thereof; assigning the plurality of matched applications to categories corresponding to the relationship of an application to the associated document; and transmitting an identification of the one or more matched applications and the assigned categories in response to receiving the one or more characters.

In still another embodiment, one or more computer-readable media having embodied thereon computer-executable instructions are provided that, when executed, perform a method for surfacing one or more applications as a function of search results, the method comprising: detecting a plurality of characters in a browser address bar, the plurality of characters having a network address format; displaying a first portion of a document associated with a document location corresponding to the detected plurality of characters; forwarding the detected plurality of characters to a search engine; receiving identification of one or more applications that are matched with keywords extracted from the plurality of characters, the associated document, or a combination thereof; displaying at least one link corresponding to a matched application; displaying a second portion of the associated document; identifying extracted keywords located within the displayed second portion of the associated document; modifying the displayed at least one link based on the identified extracted keywords located within the displayed second portion of the associated document In yet another embodiment, a computer-implemented method for surfacing one or more applications as a function of search results is provided, the method comprising: receiving one or more characters corresponding to characters detected in a browser address bar that have a network address format; extracting at least one keyword from the received one or more characters; matching a plurality of applications based on the at least one extracted keyword; determining a location of the computing device; filtering the plurality of matched applications based on the determined location; and transmitting an identification of the one or more matched, filtered applications.

In still another embodiment, one or more computer-readable media having embodied thereon computer-executable instructions are provided that, when executed, perform a method for surfacing one or more applications as a function of search results, the method comprising: receiving a first plurality of characters having a network address format that correspond to a partial network address; expanding the first plurality of characters with one or more additional characters to generate a plurality of expanded network addresses; extracting one or more primary keywords from at least one of the plurality of expanded network addresses; matching at least one first application based on the extracted one or more first keywords; receiving a second plurality of characters, the first plurality of characters in combination with the second plurality of characters having a network address corresponding to a document location; identifying a document associated with the document location; extracting one or more secondary keywords from the received first plurality and second plurality of characters, the associated document, or a combination thereof; matching at least one second application based on the extracted secondary keywords; and transmitting an identification of the at least one matched application.

In yet another embodiment, one or more computer-readable media having embodied thereon computer-executable instructions are provided that, when executed, perform a method for surfacing one or more applications based on browsing activity, the method comprising: detecting one or more characters in a browser address bar, the one or more detected characters having a network address format; extracting one or more keywords from the one or more characters in the browser address bar; forwarding the one or more extracted keywords to a search engine; receiving identification of one or more applications that are matched with the extracted keywords; and displaying at least one link corresponding to one or more matched applications.

The subject matter of embodiments of the invention disclosed herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Various embodiments of the invention have been described to be illustrative rather than restrictive. Alternative embodiments will become apparent from time to time without departing from the scope of embodiments of the inventions. It will be understood that certain features and subcombinations are of utility and may be employed without reference to other features and subcombinations. This is contemplated by and is within the scope of the claims.

What is claimed is:

1. A computer-implemented method for surfacing one or more applications based on browsing activity, the method comprising:
    receiving one or more characters corresponding to characters detected in a browser address bar that have a network address format, wherein the browser address bar comprises less than a full network address;
    matching one or more applications with at least one keyword extracted from the one or more characters;
    transmitting an identification of the one or more matched applications in response to receiving the one or more characters;
    displaying one or more surfaced applications including the one or more matched applications, an application of the one or more surfaced applications being displayed with a first viewable area of a document;
    changing the first viewable area of the document to a second viewable area of the document that includes a content portion not visible in the first viewable area;
    in response to the changing of the first viewable area, identifying that the content portion corresponds to the application;
    modifying a manner of display of the displayed application based on the identifying that the content portion corresponds to the application, the modified manner of display comprising display of the displayed application in the second viewable area of the document.

2. The computer-implemented method of claim 1, wherein receiving one or more characters corresponding to characters detected in a browser address bar comprises receiving at least one keyword extracted from the one or more characters.

3. The computer-implemented method of claim 1, further comprising extracting one or more keywords from the one or more characters, the one or more applications being matched with the at least one keyword extracted from the one or more keywords.

4. The computer-implemented method of claim 1, wherein matching one or more applications with at least one keyword comprises:
   identifying an extracted keyword containing a last character relative to a direction of text flow;
   expanding the identified extracted keyword with one or more additional characters to generate a plurality of expanded keywords; and
   matching an application based on one or more non-identified extracted keywords and an expanded keyword selected from the plurality of expanded keywords.

5. The computer-implemented method of claim 1, comprising completing the full network address, wherein the full network address comprises a uniform resource identifier or an internationalized resource identifier having a registered scheme.

6. The computer-implemented method of claim 1, further comprising:
   selecting an address template having a format that corresponds to the network address format, the address template including one or more template fields; and
   extracting the at least one keyword corresponding to the one or more template fields from the received one or more characters.

7. The computer-implemented method of claim 1, wherein matching the one or more applications with the at least one keyword comprises:
   comparing the at least one keyword with keywords in an application keyword index;
   ranking applications based on said comparing; and
   selecting at least one of the applications having a ranking greater than a ranking threshold as an application that matches the network address.

8. A system for surfacing one or more applications as a function of search results, the system comprising:
   a processor and an associated memory containing computer executable instructions, the processor executing the instructions to provide:
   an application identification component that receives a plurality characters having a network address format, the plurality of characters corresponding to a document location, and to transmit an identification of a matched application in response to receiving the one or more characters;
   an application component including:
   a selection component to select the matched application based on matching the application from an application manifest with at least one keyword extracted from the plurality of characters and at least one keyword extracted from a document associated with the document location;
   a rendering component to:
   display the matched application in an application display area separate from a document display area displaying the associated document based on the identification; and a characteristic-matching component to identify content corresponding to the one or more matched applications in the associated document;
the rendering component further to modify a manner of display of the displayed matched application based on the identified content becoming visible in the document display area, the modified manner of display comprising displaying the matched application in a different display area than the application display area.

9. The system of claim 8, wherein the matched application is assigned to at least one of a plurality of categories selected from official applications, contextual applications, recommended applications, and related applications.

10. The system of claim 8, wherein the matching comprises:
    detecting an entity based on the extracted keywords; and
    selecting one or more applications based on the detected entity.

11. The system of claim 8, wherein the selection component further assigns a recommended category to the application based on an application popularity score.

12. A computer-implemented method for surfacing one or more applications as a function of search results, the method comprising:
    detecting a plurality of characters in a browser address bar, the plurality of characters having a network address format;
    displaying a first viewable area of a document in a document display area, the document associated with a document location corresponding to the detected plurality of characters;
    forwarding the detected plurality of characters to a search engine;
    receiving an indication of a first identification of one or more surfaced applications that are at least matched with content in the associated document;
    displaying the one or more surfaced applications that include at least one link corresponding to a matched application of the one or more applications based on the first identification, wherein a manner of display of the at least one link is in an application display area separate from the document display area comprising the first viewable area;
    displaying in the document display area a second viewable area of the associated document that includes a content portion not present in the first visible area;
    in response to the displaying of the second viewable area, identifying that extracted keywords located within the content portion of the second viewable area of the associated document in a second identification correspond to the matched application;
    modifying the displayed one or more surfaced applications based on the extracted keywords being identified as corresponding to the matched application, wherein the manner of display of the at least one link corresponding to the matched application is modified to display the at least one link in the document display area.

13. The computer-implemented method of claim 12, wherein the displaying the second viewable area of the associated document comprises displaying a document portion that is made visible after translation of the document along a direction.

14. The computer-implemented method of claim 13, wherein the document is translated along a direction in response to a user input.

15. The computer-implemented method of claim 13, wherein no content of the first viewable area is displayed during display of the second viewable area.

16. The computer-implemented method of claim 13, wherein the content portion is related to an entity, the entity-related content not being visible during display of the first portion of the associated document.

17. The computer-implemented method of claim 12, further comprising:
- detecting characters corresponding to a partial network address in the browser address bar;
- extracting one or more keywords from the partial network address; and
- displaying at least one preliminary link corresponding to a received identification of an application based on a match of the keywords extracted from the partial network address,
- wherein the detected one or more characters in the browser address bar include the characters corresponding to the partial network address, and wherein said displaying the one or more surfaced applications that include the at least one link corresponding to the matched application further comprises removing the display of the preliminary link.

18. The computer-implemented method of claim 12, wherein detecting one or more characters in a browser address bar comprises detecting the one or more characters in a browser address bar prior to display of the first portion of the associated document, the method further comprising:
- extracting one or more keywords from the one or more characters in the browser address bar;
- displaying at least one preliminary link corresponding to a received identification of an application based on a match of the keywords extracted from one or more characters in the browser address bar, and
- extracting at least one additional keyword from the associated document after display of the first portion of the associated document, the at least one additional keyword corresponding to content that is part of the displayed first portion,
- wherein said displaying the one or more surfaced applications that include the at least one link corresponding to the matched application further comprises removing the display of the preliminary link.

19. The computer-implemented method of claim 12, wherein modifying the displayed one or more surfaced applications comprises changing a display location for the at least one link.

20. The computer-implemented method of claim 12, wherein modifying the displayed one or more surfaced applications comprises including another link in the displayed one or more surfaced applications in addition to the at least one link.

* * * * *